(12) United States Patent
Cottet et al.

(10) Patent No.: US 7,118,067 B2
(45) Date of Patent: Oct. 10, 2006

(54) WHEEL MOUNTED WATER SPRAY DEFLECTOR

(75) Inventors: Justin D. Cottet, Snohomish, WA (US); Mark N. Simpson, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 390 days.

(21) Appl. No.: 10/434,747

(22) Filed: May 9, 2003

(65) Prior Publication Data
US 2004/0222330 A1 Nov. 11, 2004

(51) Int. Cl.
*B64C 25/00* (2006.01)
(52) U.S. Cl. .................... 244/103 R; 244/103 S
(58) Field of Classification Search ............ 244/103 S, 244/105, 108, 103 R, 100 R; 301/37.101, 301/37.23, 37.24
See application file for complete search history.

(56) References Cited

U.S. PATENT DOCUMENTS

| 1,200,061 | A |   | 10/1916 | Wentworth |
| 1,403,446 | A |   | 1/1922 | Rothmann |
| 1,421,239 | A |   | 6/1922 | Hundleby et al. |
| 2,370,316 | A | * | 2/1945 | Juul ........................ 244/103 S |
| 3,313,501 | A |   | 4/1967 | Williams |
| 4,389,029 | A |   | 6/1983 | Glasenapp et al. |
| 6,032,900 | A | * | 3/2000 | Smith ..................... 244/103 S |

* cited by examiner

*Primary Examiner*—Peter M. Poon
*Assistant Examiner*—Timothy D. Collins
(74) *Attorney, Agent, or Firm*—Thomas F. Lebens; Fitch, Even, Tabin & Flannery

(57) ABSTRACT

A water spray deflector to deflect water spray produced from aircraft landing gear from components of the aircraft. The water spray deflector has an inner diameter and an outer diameter. Coupled to the spray deflector are attachment arms that are adapted to couple with an outer portion of a rim of the landing gear. The attachment arms are also configured to support the water spray deflector position the water spray deflector a distance from a side wall of the tire to prevent the side wall of the tire from coming in contact with the water spray deflector under various loading conditions placed on the tire. In some versions, the water spray deflector is weakened in areas to encourage a failure mode of the water spray deflector.

18 Claims, 21 Drawing Sheets

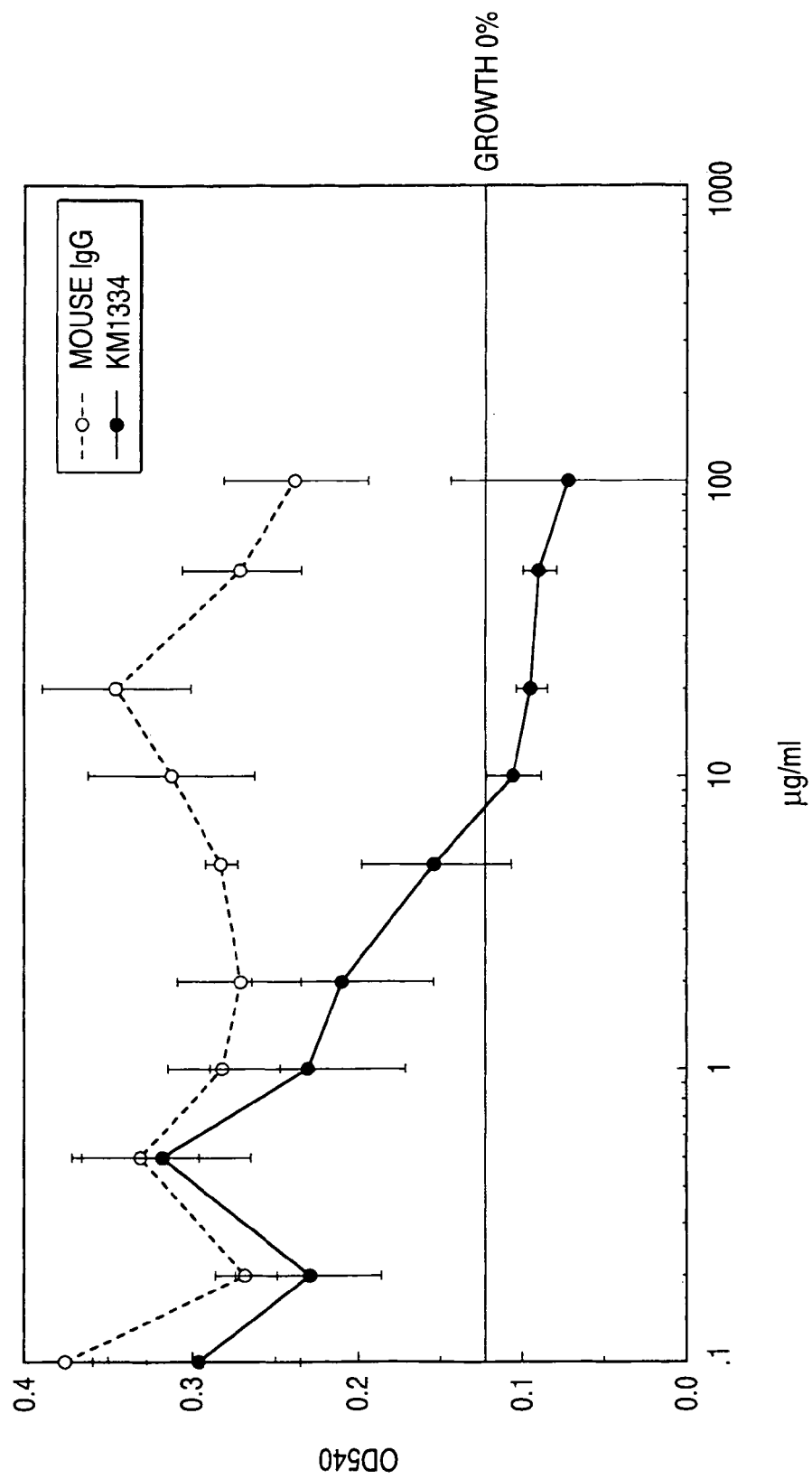

WHEEL MOUNTED WATER SPRAY DEFLECTOR

BACKGROUND OF THE INVENTION

1. Field of the Invention

The present invention relates generally to aircraft technologies, and more specifically to aircraft wheel assemblies.

2. Discussion of the Related Art

When water is present on an aircraft runway, the tires of aircraft on the wet runway displace water on take-off and landing. Some of the displaced water is projected up and away from the aircraft's tires at a relatively high velocity.

Aircraft engines, e.g., gas turbine engines, typically tolerate ingestion of a small percentage of water in relationship to the air volume that is pulled through the engine. Ingestion of large quantities of water, however, can pose a safety risk to the aircraft in the form of an unacceptably high probability of engine shutdown or thrust loss.

In addition, water potentially poses risks to vulnerable structures and/or systems on the aircraft, e.g., doors, high lift devices and hydraulic lines.

SUMMARY OF THE INVENTION

In one embodiment, the invention can be characterized as an apparatus for deflecting water away from an aircraft comprising a water spray deflector having an inner radius and an outer radius and a plurality of attachment arms coupled to the water spray deflector. The attachment arms are adapted to couple with a rim a distance away from a center of the rim, and the rim supports a tire of an aircraft. The rim has a rim radius and the tire has a tire operating radius, and the outer radius of the spray deflector is less than the operating radius of the tire. The attachment arms are configured to support the water spray deflector and the attachment arms position the water spray deflector a distance from a side wall of the tire, and the distance is a function of operating conditions of the tire.

In another embodiment, the invention can be characterized as an apparatus for deflecting water away from an aircraft comprising means for deflecting water, and the means for deflecting water comprises means for encouraging a failure mode during a tire event. The apparatus also includes means for coupling the means for deflecting water to a rim of an aircraft wheel that supports a tire; and the apparatus includes means for positioning the means for deflecting water a distance from a side wall of the tire to prevent the side wall of the tire from contacting the means for deflecting water.

In a further embodiment, the invention may be characterized as a method for deflecting water from an aircraft comprising the steps of: receiving a water spray deflector having an inner radius and an outer radius wherein the water spray deflector is coupled to a plurality of attachment arms; positioning the water spray deflector a distance from a sidewall of an aircraft tire wherein the distance is a function of operating characteristics of the aircraft tire; and coupling the attachment arms to an outer portion of a rim wherein the rim supports the aircraft tire, wherein the rim has a rim radius and the tire has a tire operating radius, wherein the tire operating radius is greater than the outer radius of the water spray deflector.

In yet another embodiment, the invention may be characterized as a method for making a water spray deflector comprising the steps of: forming a water spray deflector having an inner radius and an outer radius wherein the outer radius is a function of a radius of an aircraft tire; preparing a plurality of attachment arms wherein the attachment arms are sized and configured as a function of operating characteristics of the aircraft tire; and coupling the plurality of attachment arms to the water spray deflector, wherein the attachment arms are adapted to couple with a rim, wherein the rim supports the aircraft tire.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
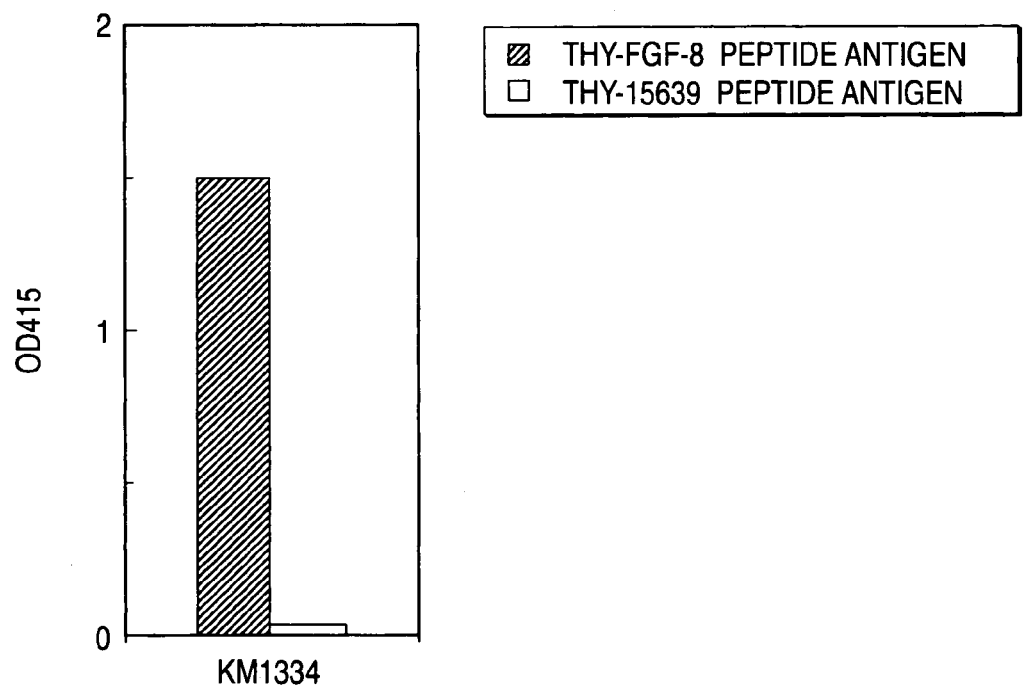
FIG. 1 is a front view of an unobstructed water spray trajectory emanating from a runway surface proximate to a tire of landing gear of an aircraft.

Referring first to FIG. 1, shown is a front view of an aircraft and unobstructed water spray trajectories emanating from a runway surface proximate to a tire of the aircraft. Shown is an aircraft body 102, an aircraft wing 104, an aircraft engine 106, a landing gear assembly 108, an outboard tire 110 and a range unobstructed water spray trajectories 112, that vary with operational conditions.

The aircraft body 102 is coupled to the aircraft wing 104 and the aircraft wing 104 is coupled to the aircraft engine 106. The aircraft wing 104 is also coupled to the landing gear assembly 108 and the outboard tire 110 is coupled to the landing gear assembly 108. The unobstructed water spray trajectories 112 are typical of water spray trajectories when the aircraft is traveling between 50 and 150 knots on a wet runway and are shown between the outboard tire 110 and the aircraft engine 106. Additionally, the aircraft engine 106 is shown positioned on an outboard and aft side of the landing gear assembly 108.

As shown, without obstruction, it is possible that a substantial amount of concentrated water will spray from the outboard tire 110 into the aircraft engine 106. It is not unusual for a water spray to travel at speeds that produce a spray that can exert impingement loads as much as 2000 pounds. Problematically, such a concentrated, high volume stream of water may also interfere with the normal operation of the aircraft engine 106, and even worse, may lead to engine failure.

Figure 2:
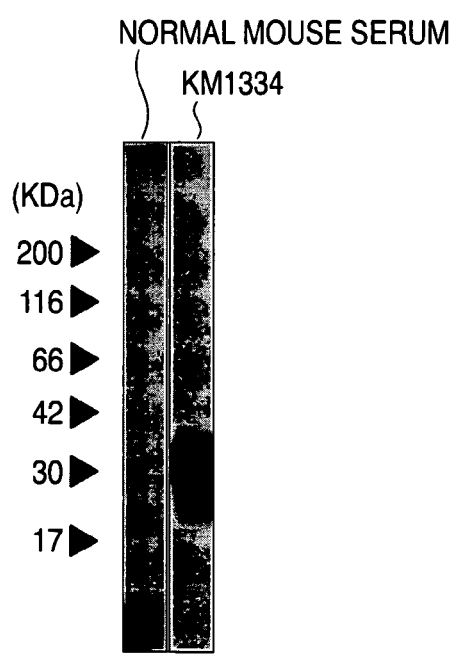
FIG. 2 is a front view of a water spray deflector assembly coupled to an outboard wheel of the aircraft landing gear in accordance with one embodiment of the present invention.

Referring next to FIG. 2, shown is a water spray deflector assembly 200 coupled to an outboard rim of the landing gear assembly in accordance with one embodiment of the present invention. Shown is the aircraft body 102, the aircraft wing 104, the aircraft engine 106, the landing gear assembly 108, the outboard tire 110 an initial water spray 202 and a diffuse water spray 204.

The aircraft represented in FIG. 2 is the same as the aircraft in FIG. 1 except that coupled to an outboard rim of the landing gear assembly 108 is a water spray deflector assembly 200, and the initial water spray 202 is shown between the outboard tire 110 and the water spray deflector assembly 200. Also shown is the diffuse water spray 204 emanating from the water spray deflector assembly 200.

The initial water spray 202 is a high velocity stream of water that would, if not obstructed, produce the unobstructed water spray trajectories 112 described with reference to FIG. 1. The diffuse water spray 204 represents a less concentrated water spray produced by the water spray deflector assembly 200 interfering with the initial water spray 202.

Typical aircraft engines are designed to accommodate the ingestion of a certain volumetric rate of unconcentrated of water. For example, typical aircraft engines are designed to tolerate water ingested during thunderstorms. Advantageously, the diffuse water spray 204 produced by the water spray deflector assembly 200 is much more like a natural rain, that aircraft engines are designed to tolerate, than a potentially disastrous large volume of water that otherwise may be ingested into the aircraft engine 106 if not obstructed.

As shown in FIG. 2, the water spray deflector assembly is positioned close to an outboard surface of the outboard tire 110. In this way, the initial water spray 202 is deflected before it has an opportunity to spread apart. Thus, the water spray deflector assembly 200 need not have a deflection member with a large cross sectional area to disrupt the initial water spray 202, and hence, the water spray deflector assembly 200 is effective while at the same time being light weight with a slim aerodynamic profile.

Figure 3:
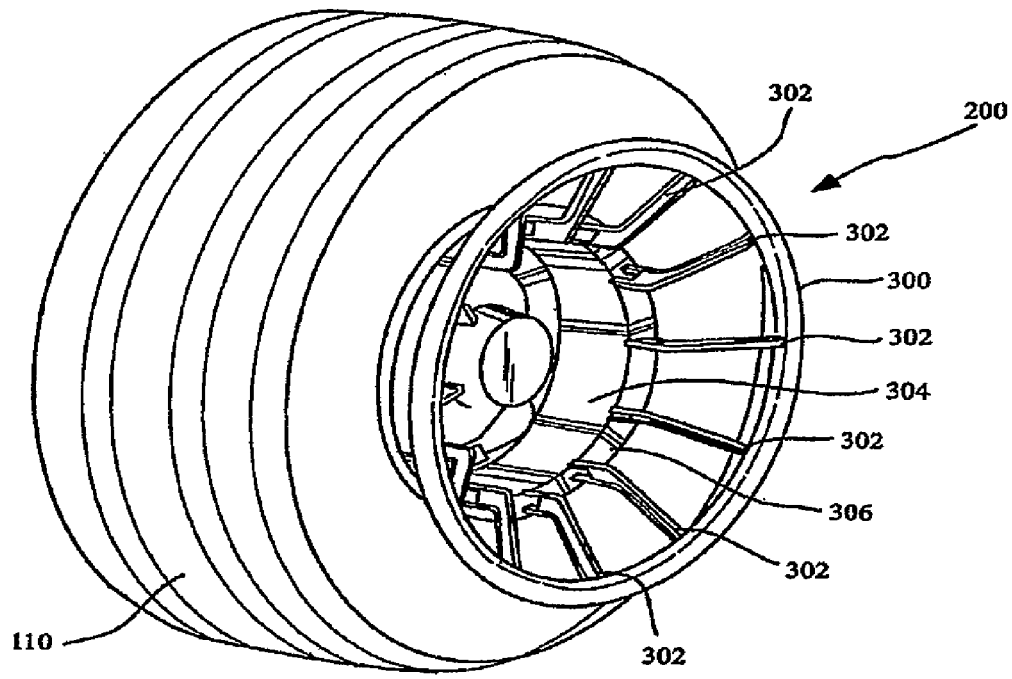
FIG. 3 is a perspective view of the water spray deflector assembly of FIG. 2.
Figure 4:
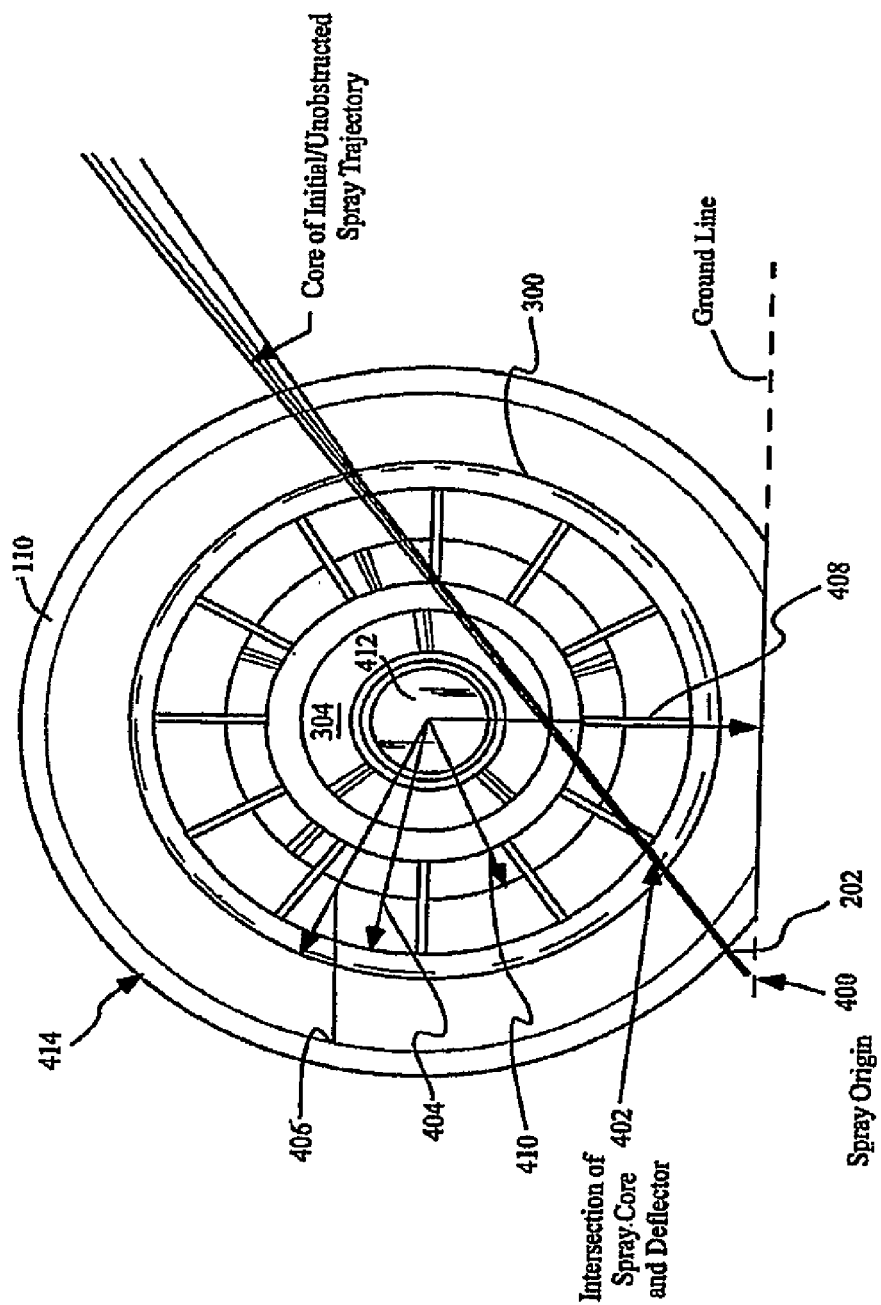
Figure 5:
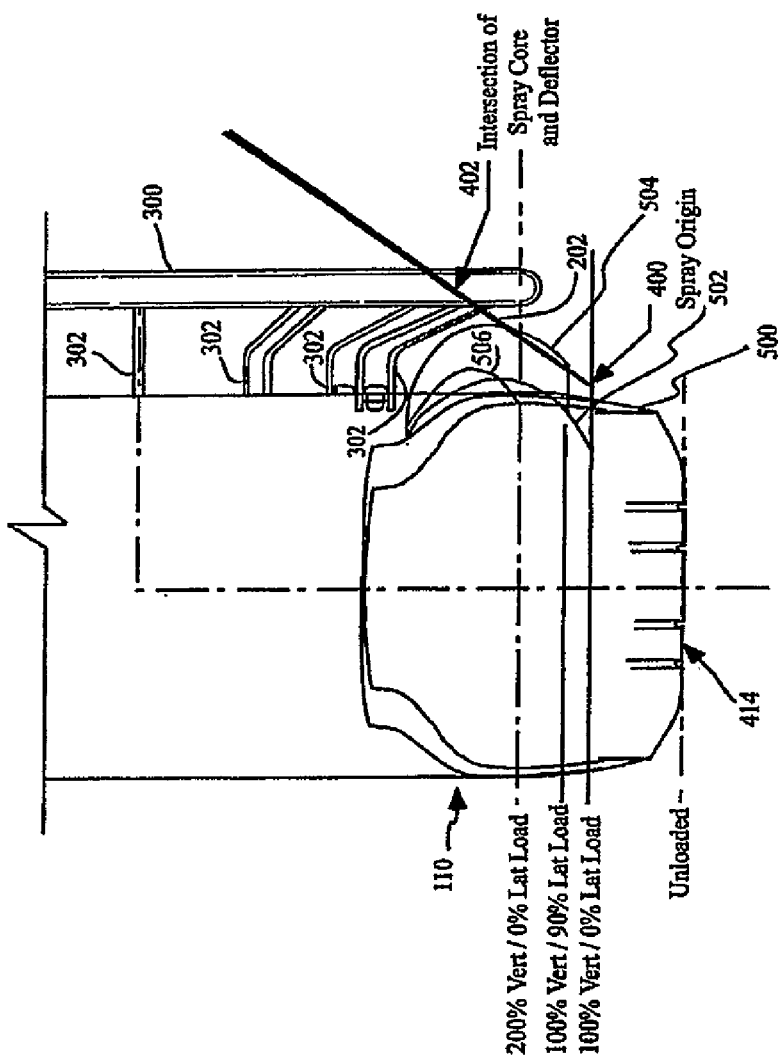
Figure 6:
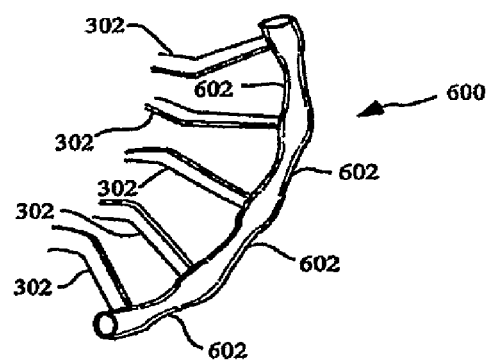
Figure 7:
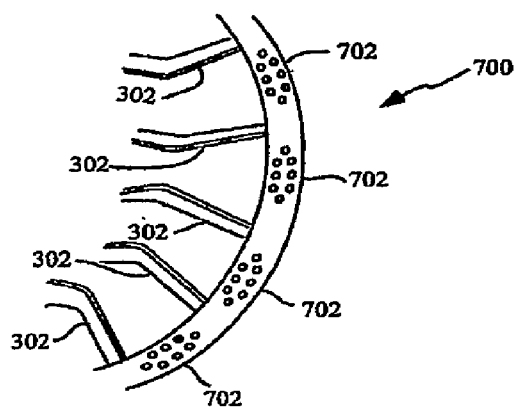
Figure 8:
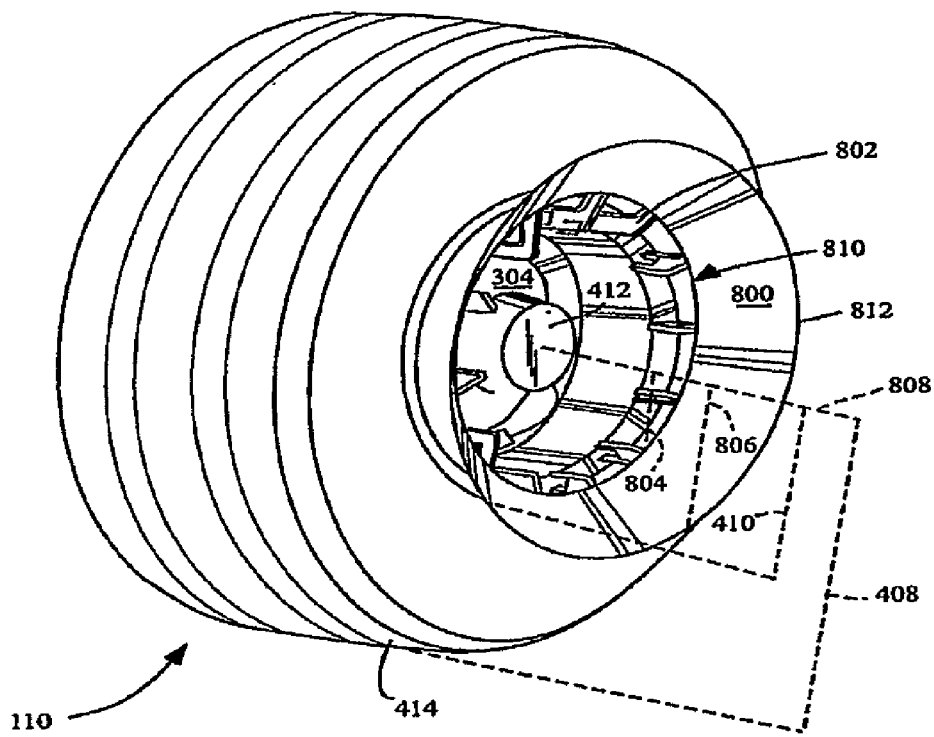

Referring next to FIG. 3, shown is a perspective view of the water spray deflector assembly of FIG. 2. Shown is a water spray deflector 300, attachment arms 302, a rim 304, a balance lug 306 and the outboard tire 110.

The attachment arms 302 are shown positioned between the balance lug 306 and the water spray deflector 300. Each of the attachment arms is coupled at one end to the balance lug 306 and coupled at another end to the water spray deflector 300, and the attachment arms 302 collectively are disposed about balance lug 306 and the water spray deflector 300. The balance lug 306 is coupled to the rim 304 and the rim is coupled to the outboard tire 110.

In several embodiments, the rim 304 is a readily available and unmodified rim of an aircraft wheel that includes the balance lug 306 which is integrated with the rim 304. Advantageously, the balance lug 306 provides a convenient point of connection for the attachment arms 302 because the balance lug 306 is configured by design and manufacture to couple with balance weights, and thus, the attachment arms 302 may be easily adapted to mechanically couple with the balance lug 306 in a similar manner as an ordinary balance weight.

As shown in FIG. 3, the balance lug 306 is located away from a center of the rim 304 and near an outer circumference of the rim 304. Beneficially, placement of the balance lug 306 away from the center of the rim 304 allows the attachment arms 302, and hence the water spray deflector 300, to be coupled with the rim 304 without obstructing sensors and other equipment, e.g., anti-lock brake systems, present in an axle of the landing gear assembly 108.

In several embodiments, and as shown in FIG. 3, the water spray deflector 300 is made from a metallic tube that is formed into a ring prior to the attachment arms 302 being coupled thereto. A tubular structure is certainly not required, but tubular structures are relatively easy to manufacture. As discussed further with reference to FIG. 8, water spray deflectors in accordance with the present invention may take on other embodiments including a flat sheet-like structure.

The water spray deflector 300 and attachment arms 302, in several embodiments, are constructed of Aluminum, however, this is certainly not required, and other metals, including alloys, may be used in other embodiments.

Figure 4:
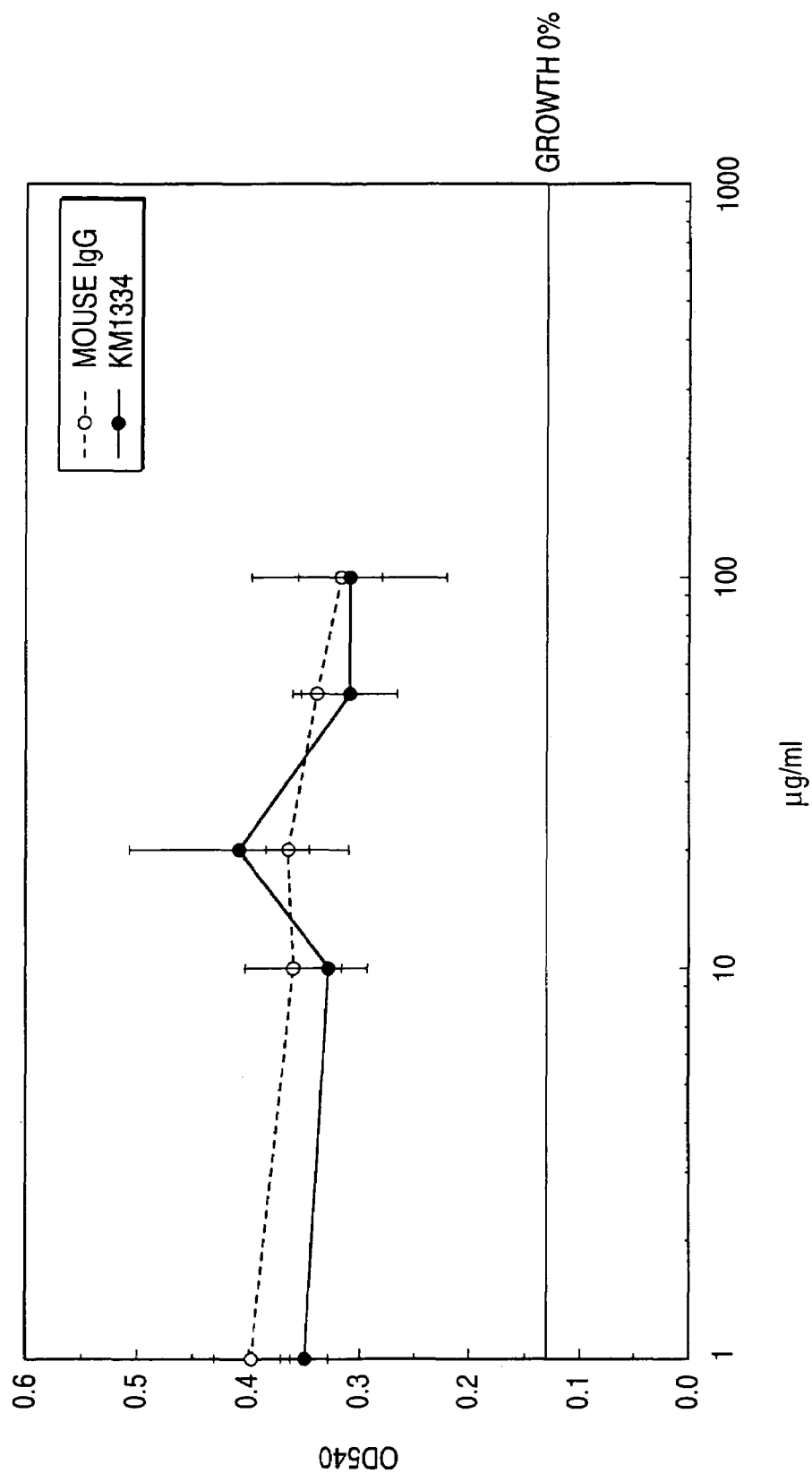
FIG. 4 is a side view of the water spray deflector assembly of FIG. 3.

Referring next to FIG. 4, shown is a side view of the water spray deflector assembly 200 of FIG. 3. Shown, in addition to the same components identified with reference to FIG. 3, are the initial water spray 202, a spray origin 400, a deflection zone 402, an inner deflector radius 404, an outer deflector radius 406, a tire operating radius 408, a rim radius 410, a rim center 412 and a tire tread surface 414.

The spray origin 400 is shown just forward of the tire 110, and the deflection zone 402 located on the water spray deflector 300 is shown forward of, and below, the rim center 412. The inner deflector radius 404 is shown as a distance between the rim center 412 and a portion of a surface of the water spray deflector 300 closest to the rim center 412. The outer deflector radius 406 is shown as a distance between the rim center 412 and a portion of a surface of the water spray deflector 300 that is farthest from the rim center 412, and in the present embodiment, is equal to the inner deflector radius 404 plus a diameter of the water spray deflector 300. The tire operating radius 408 is shown as a distance from the rim center 412 to the tire tread surface 414 of the tire 110, and the rim radius 410 is shown as a distance between the rim center 412 and a point where the rim 304 terminates.

In several embodiments, and as shown in FIG. 4, the water spray deflector 300 has an outer deflector radius 406 that is less than the tire radius 408 and in inner deflector radius 404 that is greater than the rim radius 410. Advantageously, the water spray deflector 300 need not have a large cross sectional area to effectively deflect the initial water spray 202 because the water spray deflector 300 is positioned in close proximity to the spray origin 400. In this way, the initial water spray 202 is deflected before the initial water spray 202 has an opportunity to substantially expand beyond the cross sectional area of the water spray deflector 300. As a result, the water spray deflector 300 is effective to obstruct the initial water spray 202 without adding unnecessary weight or aerodynamic drag to an aircraft.

Figure 5:
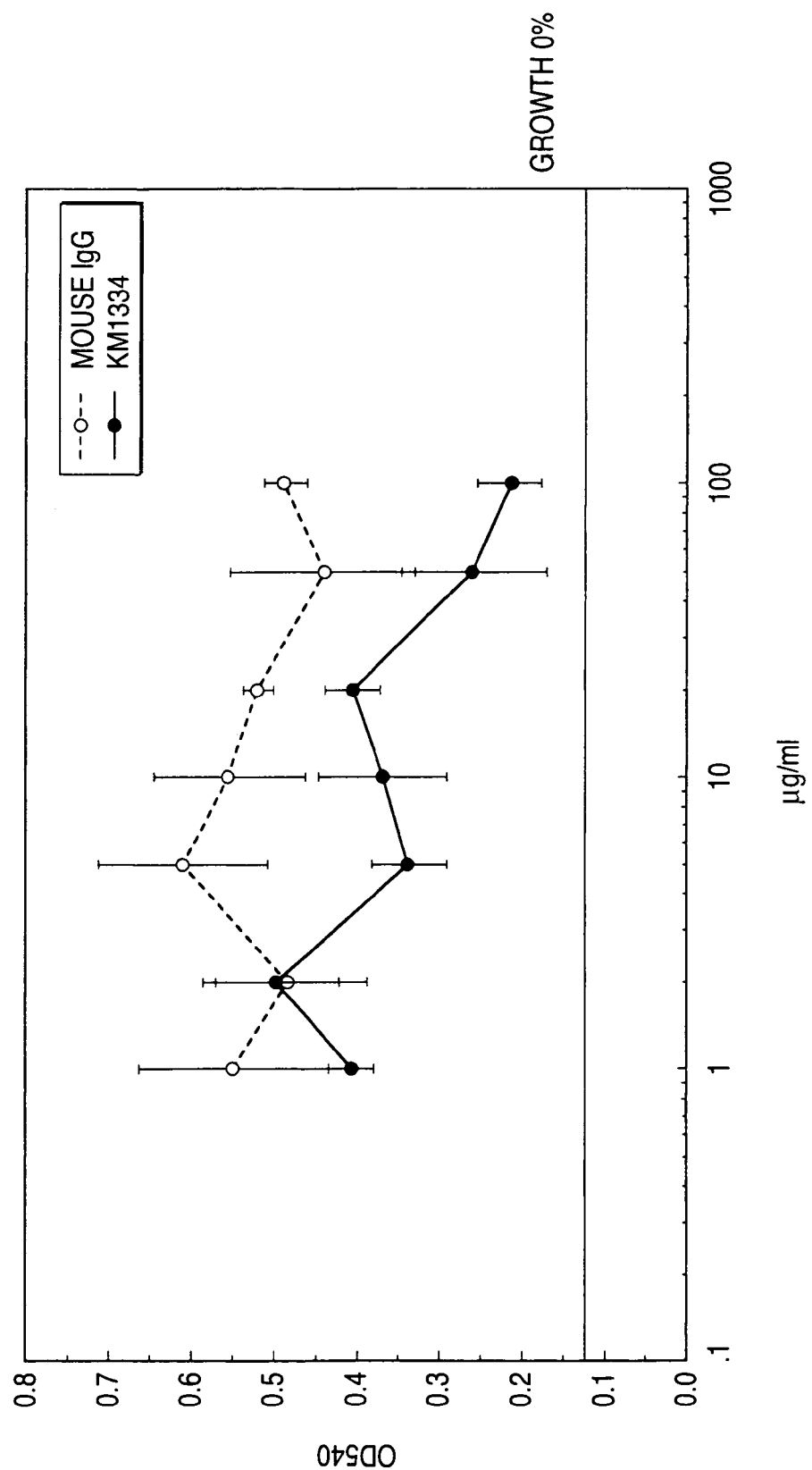
FIG. 5 is a partial front view of the water spray deflector assembly of FIG. 4.

Referring next to FIG. 5, shown is a partial front view of the water spray deflector assembly of FIG. 4. Shown is a portion of the tire 110 as viewed from the tread surface 414 of the tire 110. Also shown are four of the attachment arms 302, the water spray deflector 300, the initial water spray 202, the spray origin 400 and the deflection zone 402. Also shown are an unloaded tire sidewall 500 and representations of a 100/0 loaded side wall 502, a 100/90 loaded sidewall 504, and 200/0 loaded sidewall 506.

The initial water spray 202 is shown originating from the spray origin 400 and is shown coming in contact with the water spray deflector 300 at the deflection zone 402.

The representations of the tire sidewall are shown as an outline of where the sidewall of the tire would be under various loading conditions. Specifically, the 100/0 loaded sidewall 502 is a representation of the sidewall of the tire 110 under a 100% vertical load and a 0% lateral load, the 100/90 loaded sidewall 504 is a representation of the sidewall of the tire under a 100% vertical load and a 90% lateral load and the 200/0 loaded sidewall 506 is a representation of the sidewall of the tire under a 200% vertical load and a 0% lateral load. The unloaded sidewall 500 is shown in an unloaded condition, i.e., without substantial horizontal or vertical loads place thereon.

In practice, when the tire 110 is under normal loading conditions, i.e., 100% vertical load and 0% lateral load, and the aircraft is traveling down a runway covered with water, the initial water spray 202 is generated and travels away from both the runway and the tire 110 until it intersects with the water spray deflector 300 at the deflection zone 402. Once the initial water spray 202 intersects with the water spray deflector 300, the initial water spray is broken up by the water spray deflector 300 and water making up the initial water spray 202 is dispersed in several directions as represented by the diffuse water spray 204 shown in FIG. 2.

In several embodiments, the water spray deflector 300 is positioned as a function of a type of tire utilized. For example, as shown with reference to FIG. 5, the water spray deflector 300 is positioned to intersect the initial water spray 202 when the tire is under normal loading conditions, and the water spray deflector 300 is also positioned far enough away from the side wall of the tire so that even under 100% vertical loading and 90% lateral loading, the side wall of the tire, as shown by the 100/90 loaded sidewall 504, does not come in contact with the water spray deflector 300; thus, preventing damage to the tire 110 and the water spray deflector 300. Because lateral tire displacement for a given load varies depending upon the type of tire utilized, the water spray deflector 300 in several embodiments is positioned based upon known lateral displacement for the given loads to avoid coming in contact with the tire.

It should be recognized that the water spray deflector 300 in other embodiments is positioned to allow higher lateral loads. For example, the water spray deflector 300 in some embodiments is positioned farther away from the sidewall of the tire to allow a greater lateral tire displacement before the sidewall of the tire contacts the water spray deflector 300.

Figure 6:
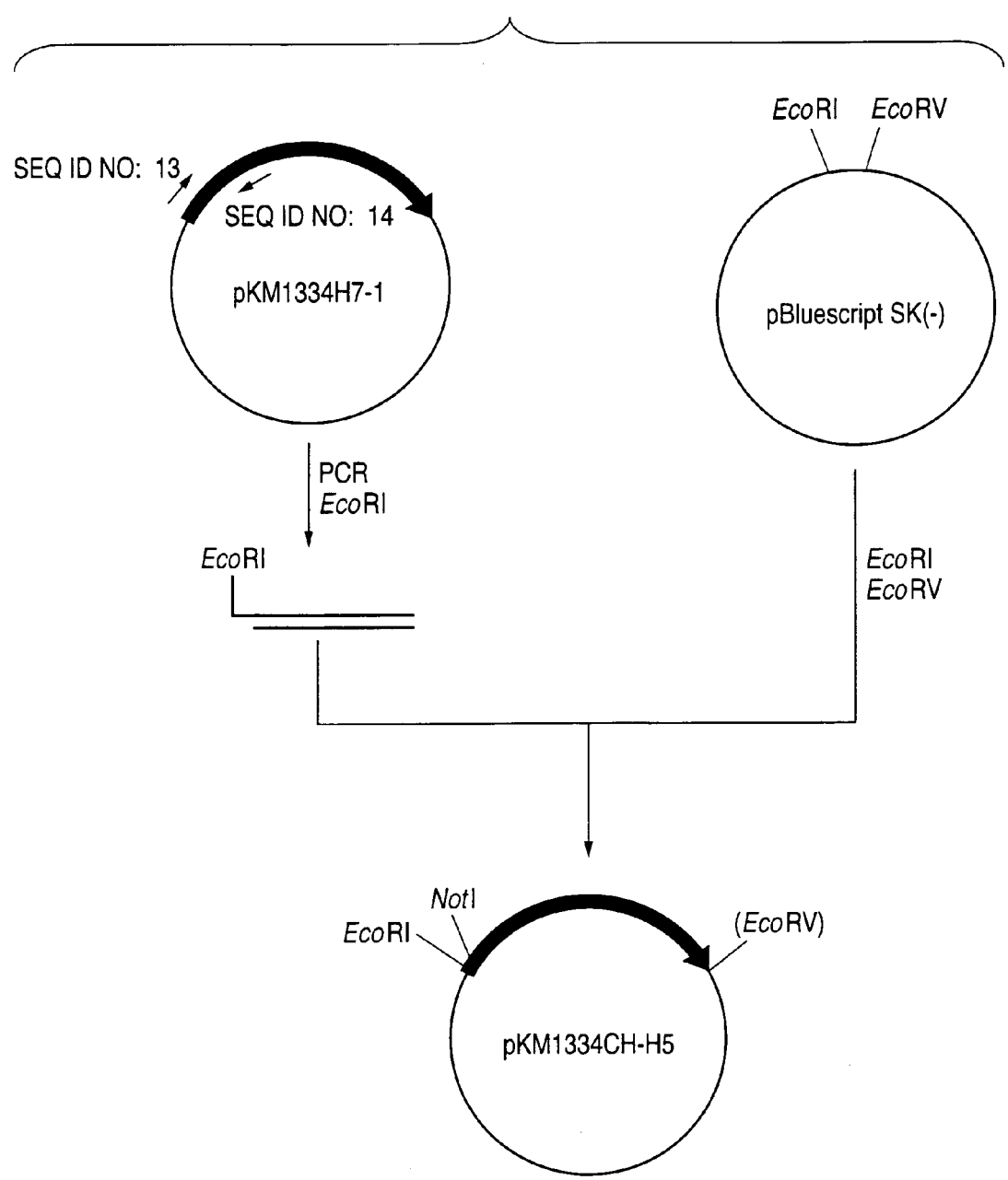
FIG. 6 is a partial view of one embodiment of a water spray deflector with portions of the water spray deflector crimped or waisted down to promote a predictable and controlled failure of the water spray deflector.

Referring next to FIG. 6, shown is a partial view of one embodiment of a water spray deflector 600 with portions of the water spray deflector crimped to promote a controlled failure of the water spray deflector. Shown are portions of five attachment arms 302, a partial view of a water spray deflector with crimped portions 602 between the attachment arms 302.

As shown, the water spray deflector 600 is crimped between bonding areas where the attachment arms 302 couple with the water spray deflector 600. In this way, the water spray deflector 600 is weakened so that if there is a tire event, e.g., extreme lateral displacement resulting in a side wall of the tire impacting the water spray deflector 600 or a tire failure, the water spray deflector 600 will tend to deform rather than break free from a rim, e.g., the rim 304. In this way, the likelihood of the water spray deflector 600 being ingested into the aircraft engine 106 is reduced.

Figure 7:
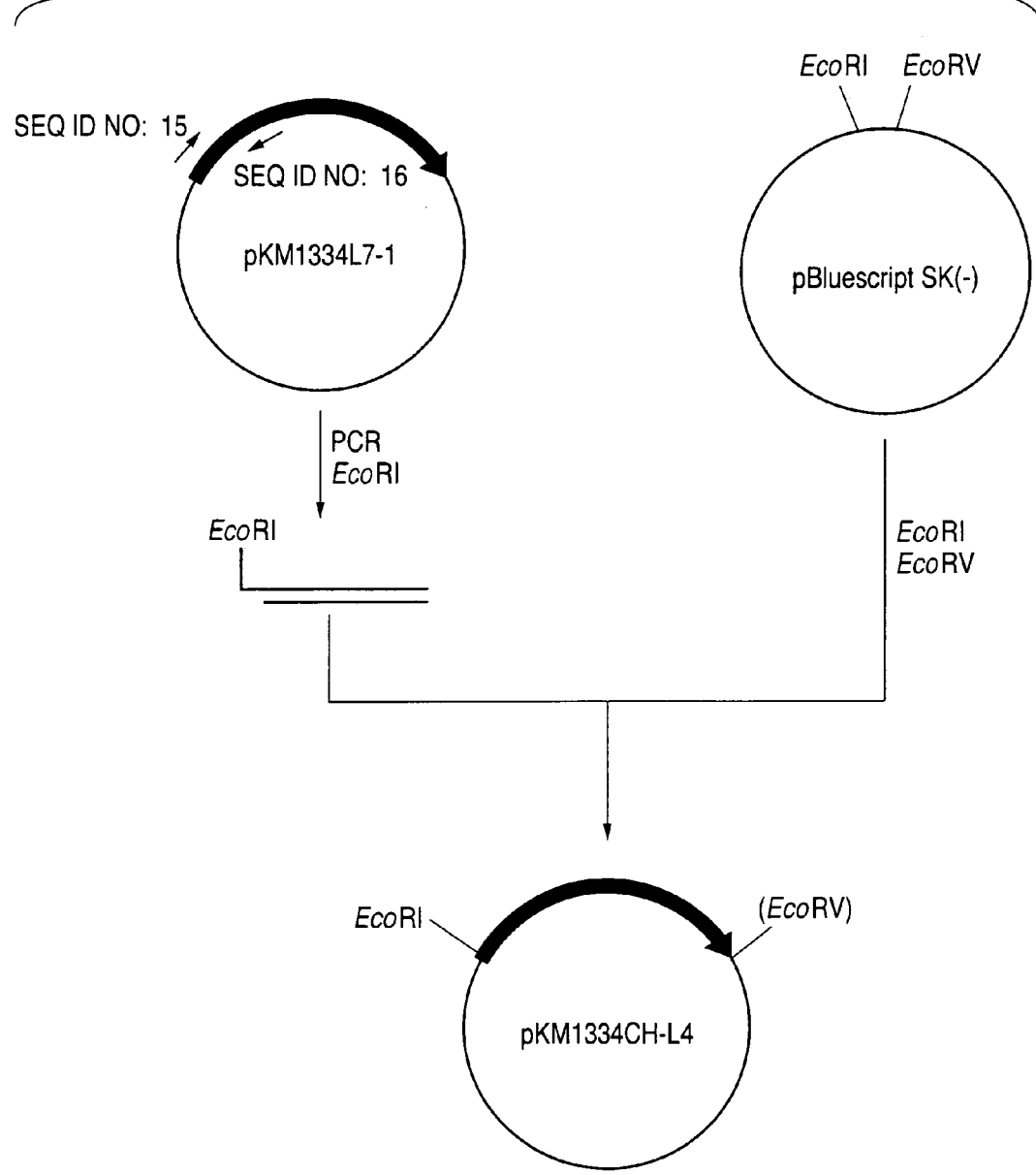
FIG. 7 is a partial view of another embodiment of a water spray deflector having holes drilled in portions thereof to promote a predictable and controlled failure of the water spray deflector in the event of a tire failure.

Referring next to FIG. 7, shown is a partial view of another embodiment of a water spray deflector having holes drilled in portions thereof to promote a controlled failure of the water spray deflector. Shown are a portion of the attachment arms 302 and a partial view of a water spray deflector 700 having holes 702 drilled through areas between coupling points of the attachment arms 302.

The holes 702 in the water spray deflector 700 are between areas where the attachment arms 302 couple with the water spray deflector 700. In this way, the water spray deflector is weakened so that if there is a tire event the water spray deflector 700 will tend to deform rather than break free from a rim. Thus, the likelihood of the water spray deflector 700 being ingested into the aircraft engine is reduced.

Figure 8:
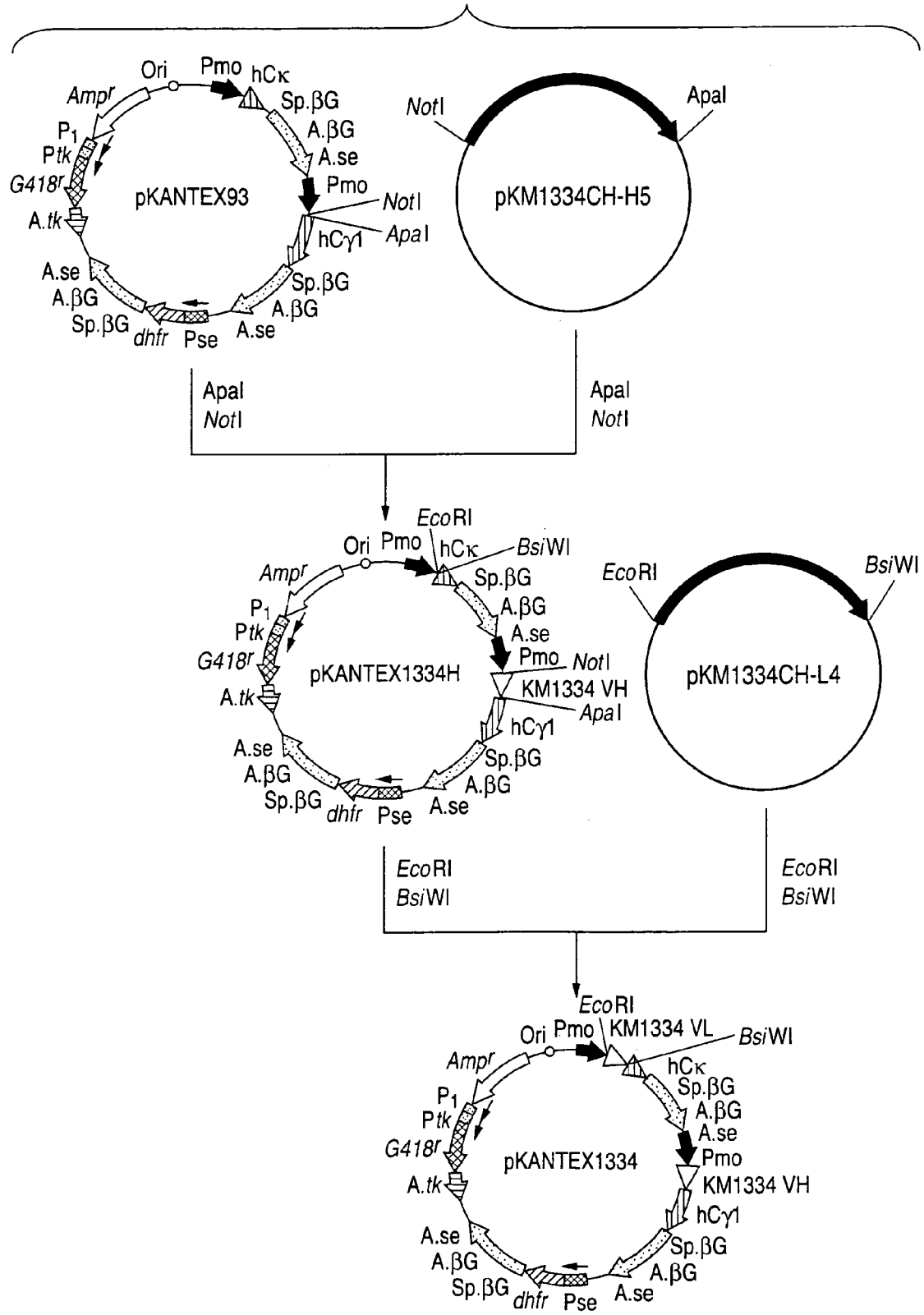
FIG. 8 is another embodiment of a conical shaped water spray deflector in accordance with another embodiment of the present invention.
Figure 9:
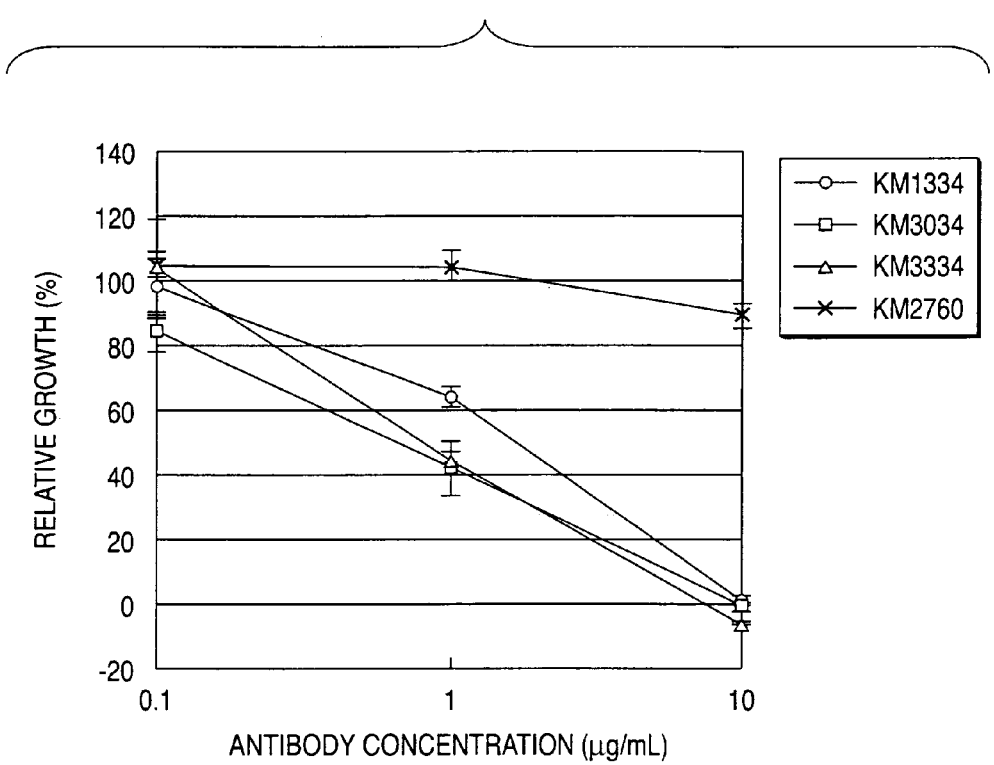
Figure 10:
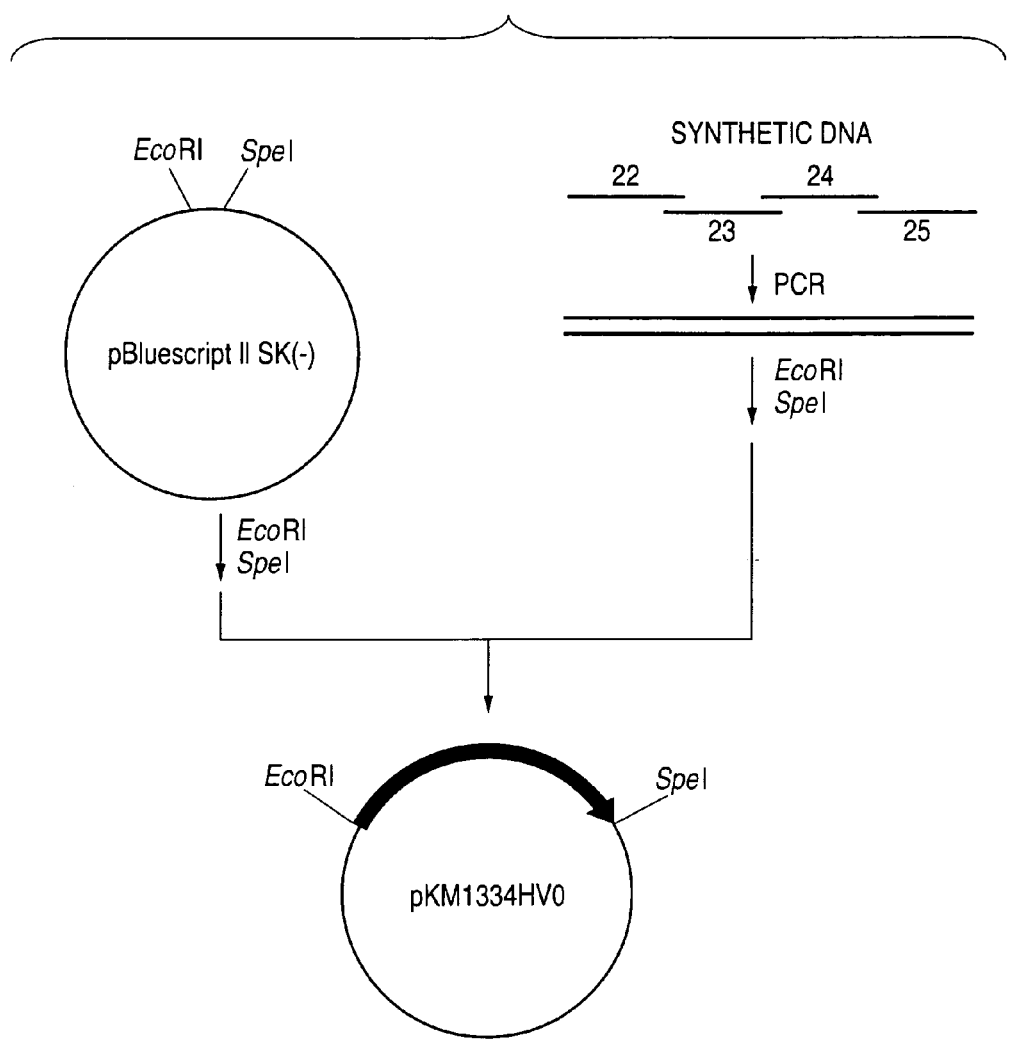
Figure 11:
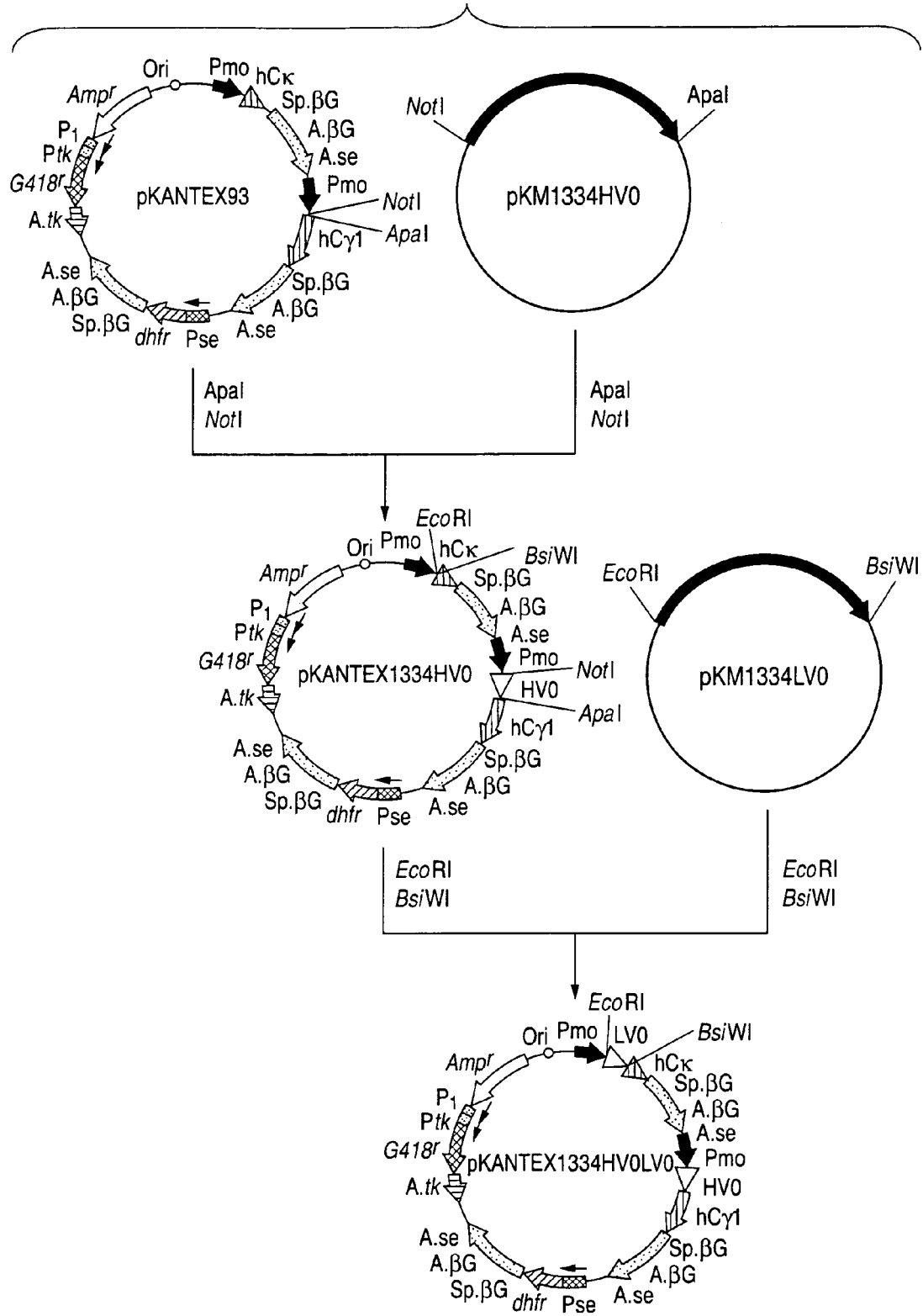
Figure 12:
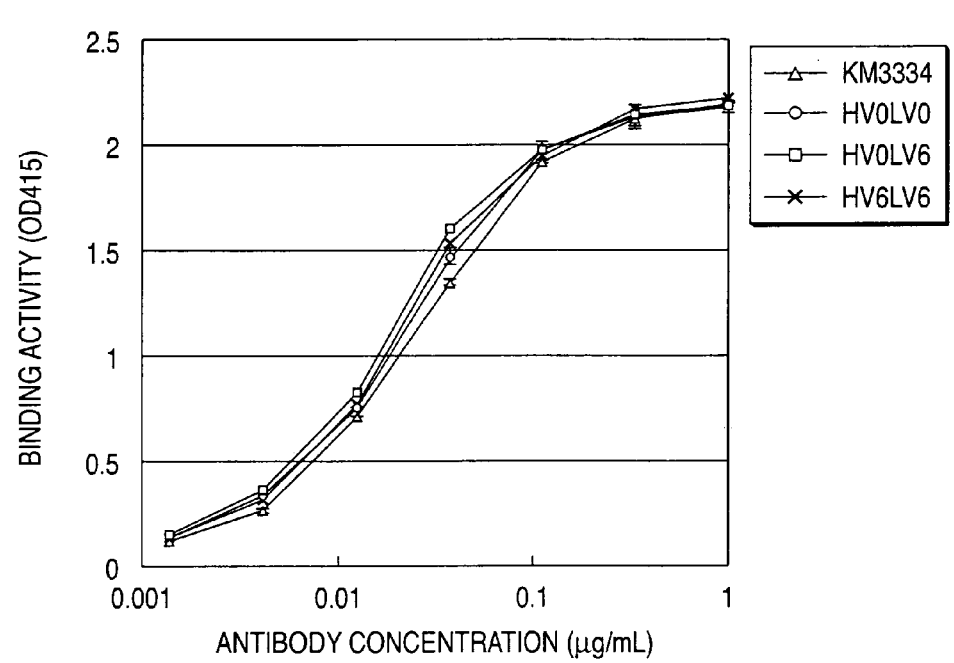
Figure 13:
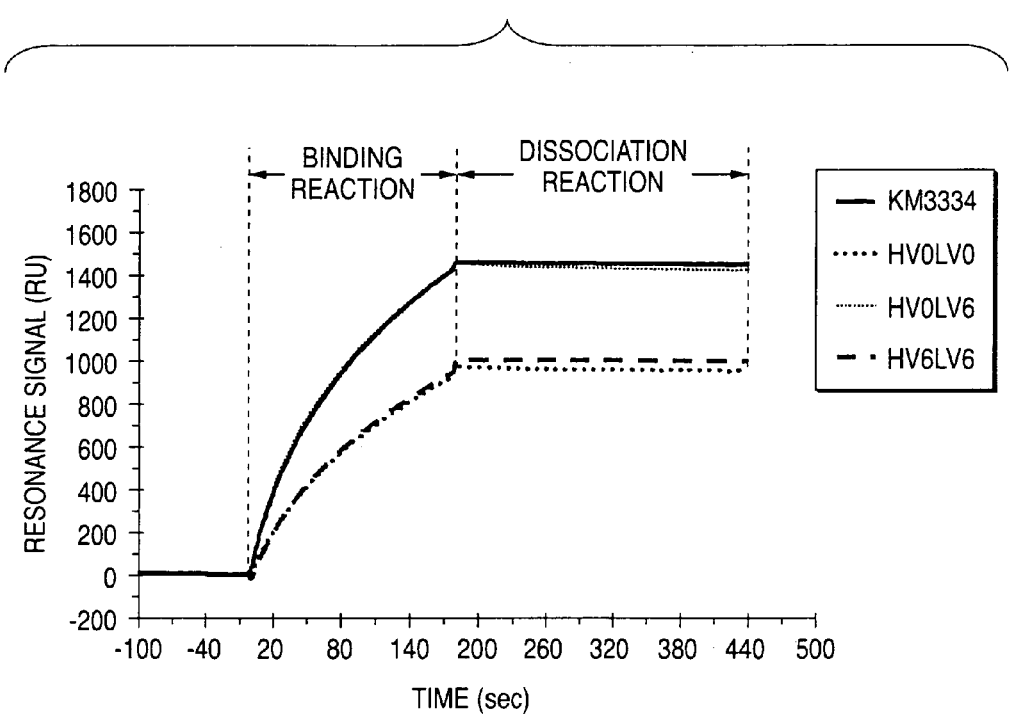
Figure 14:
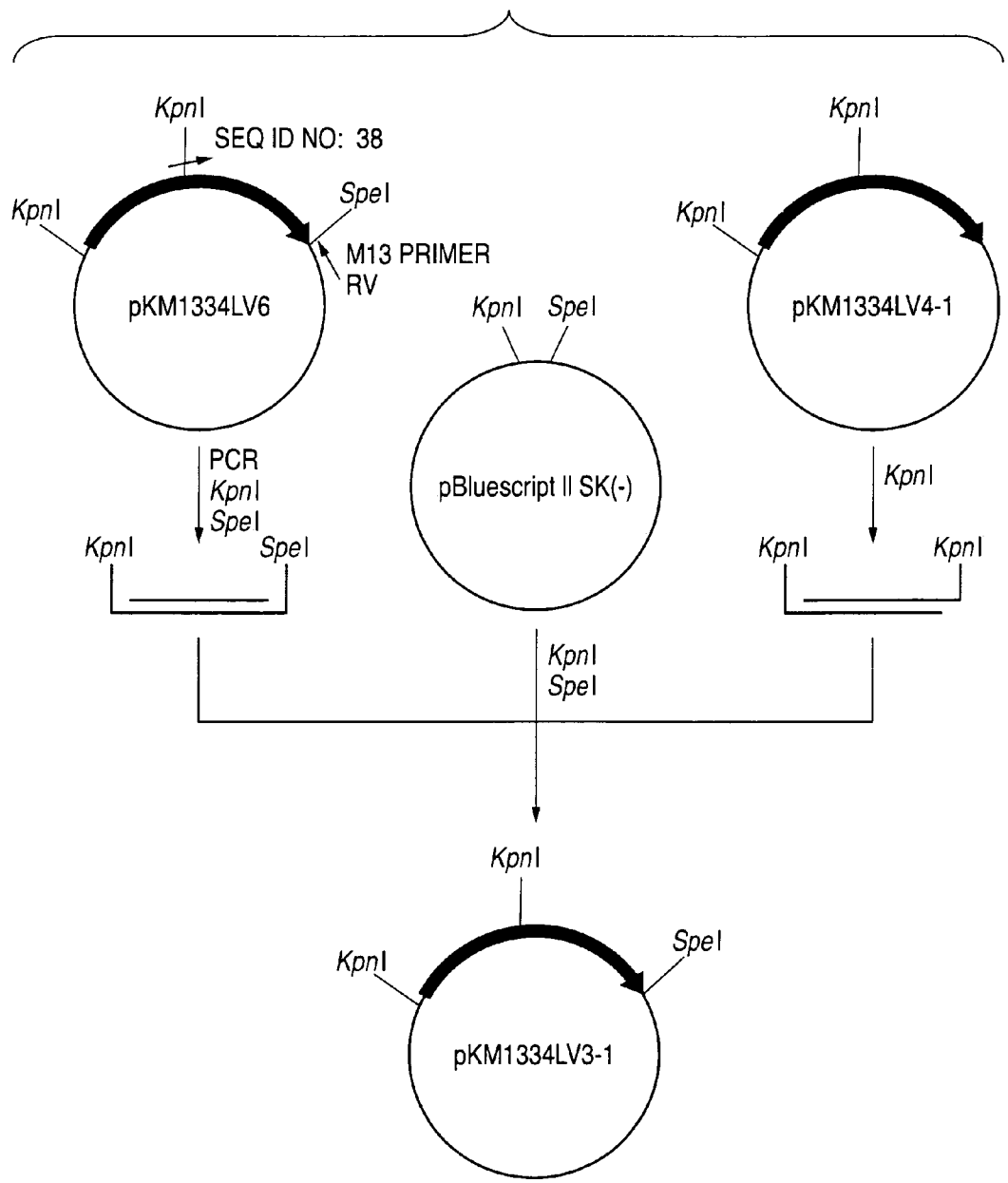
Figure 15:
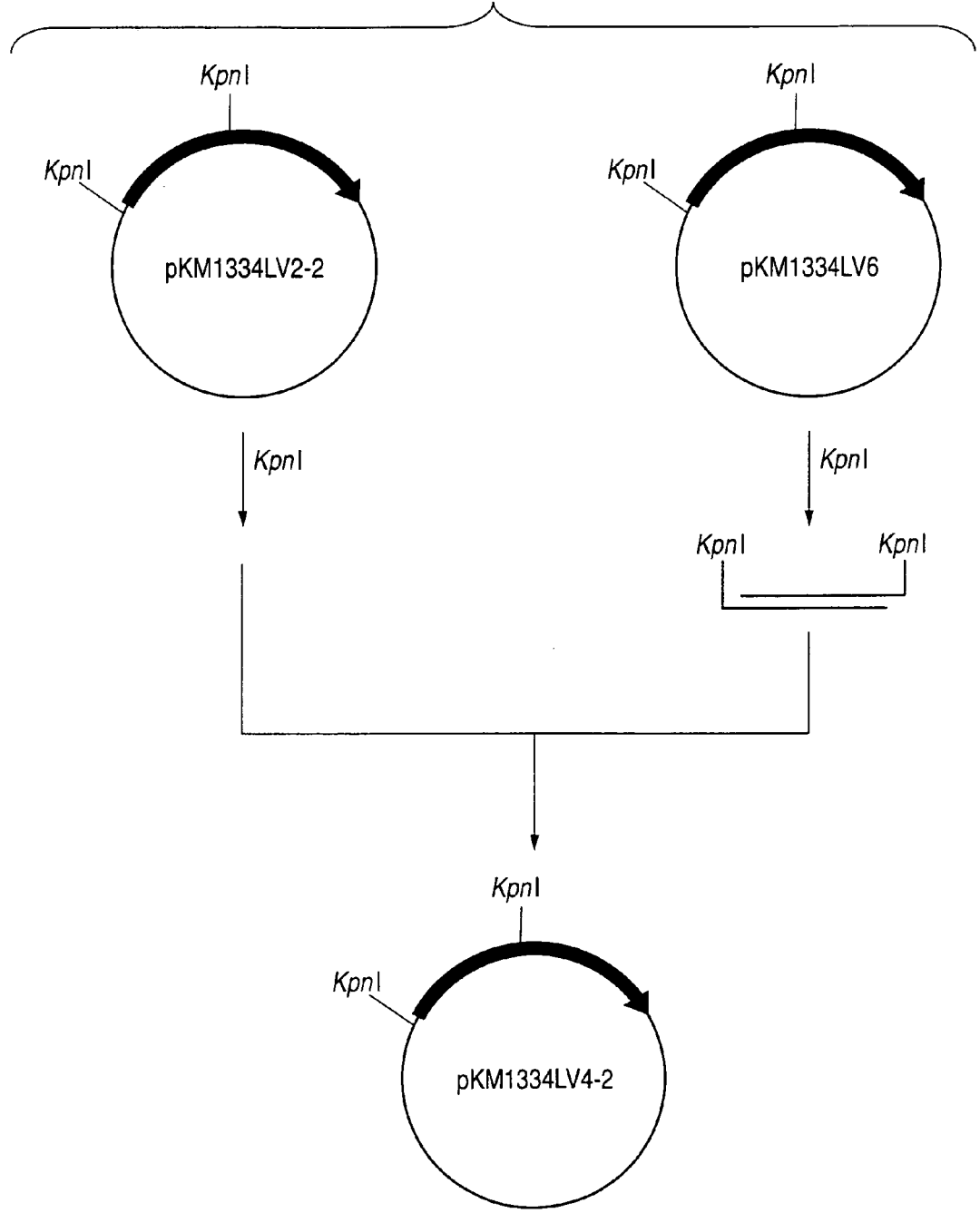
Figure 16:
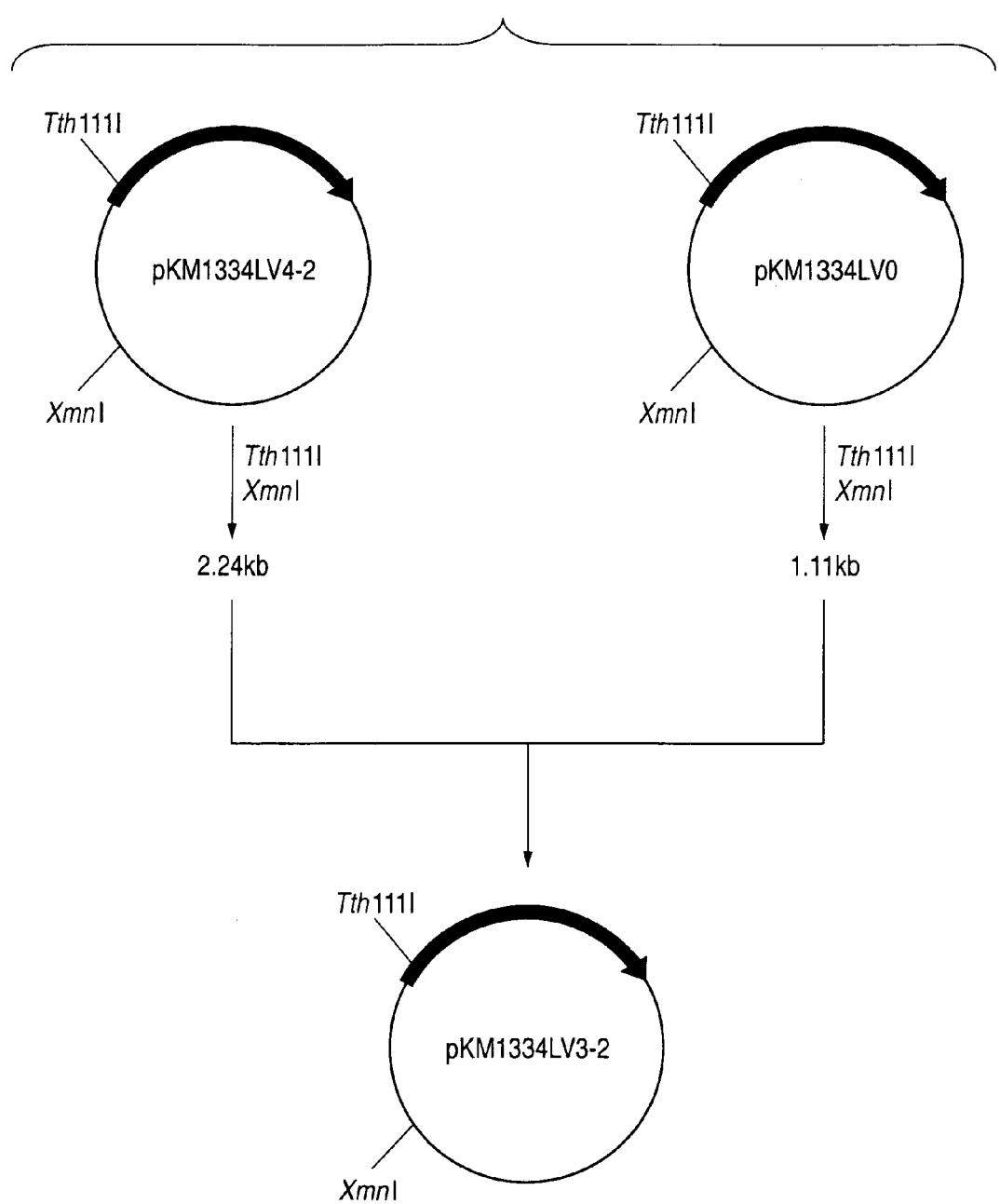
Figure 17:
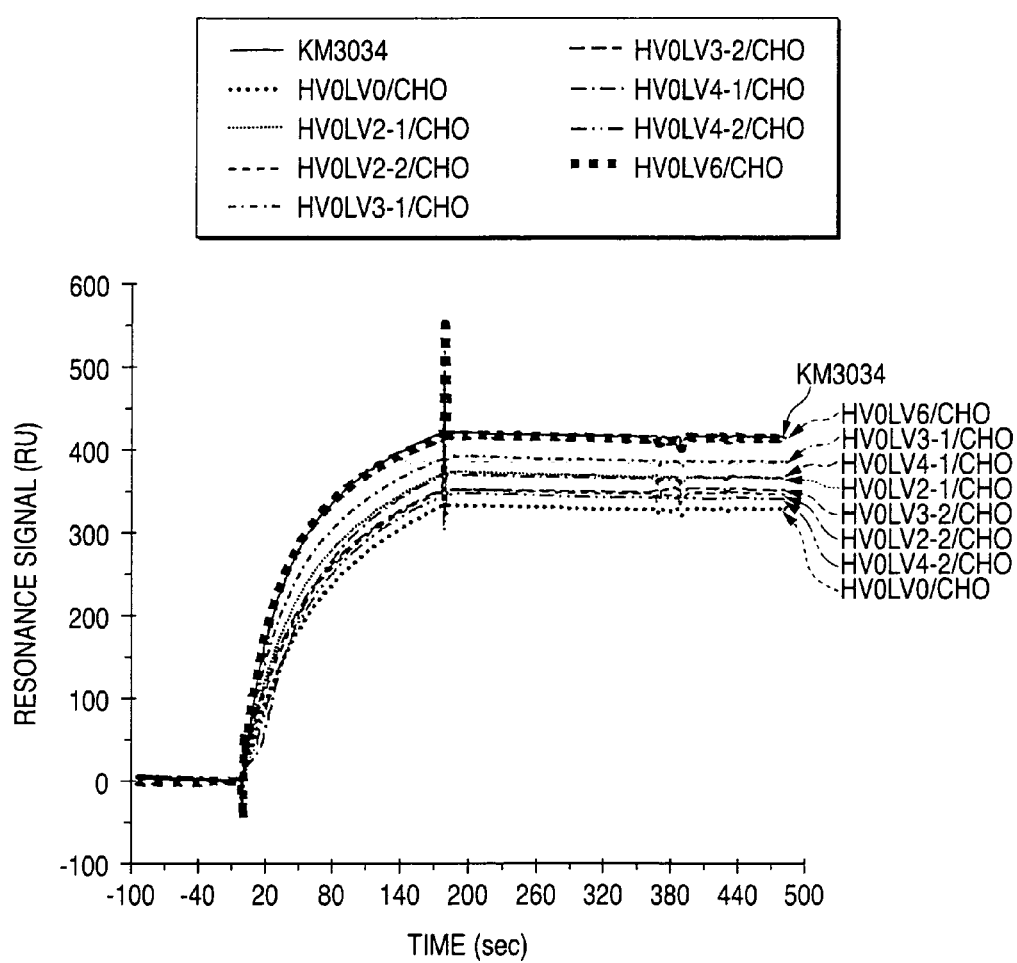
Figure 18:
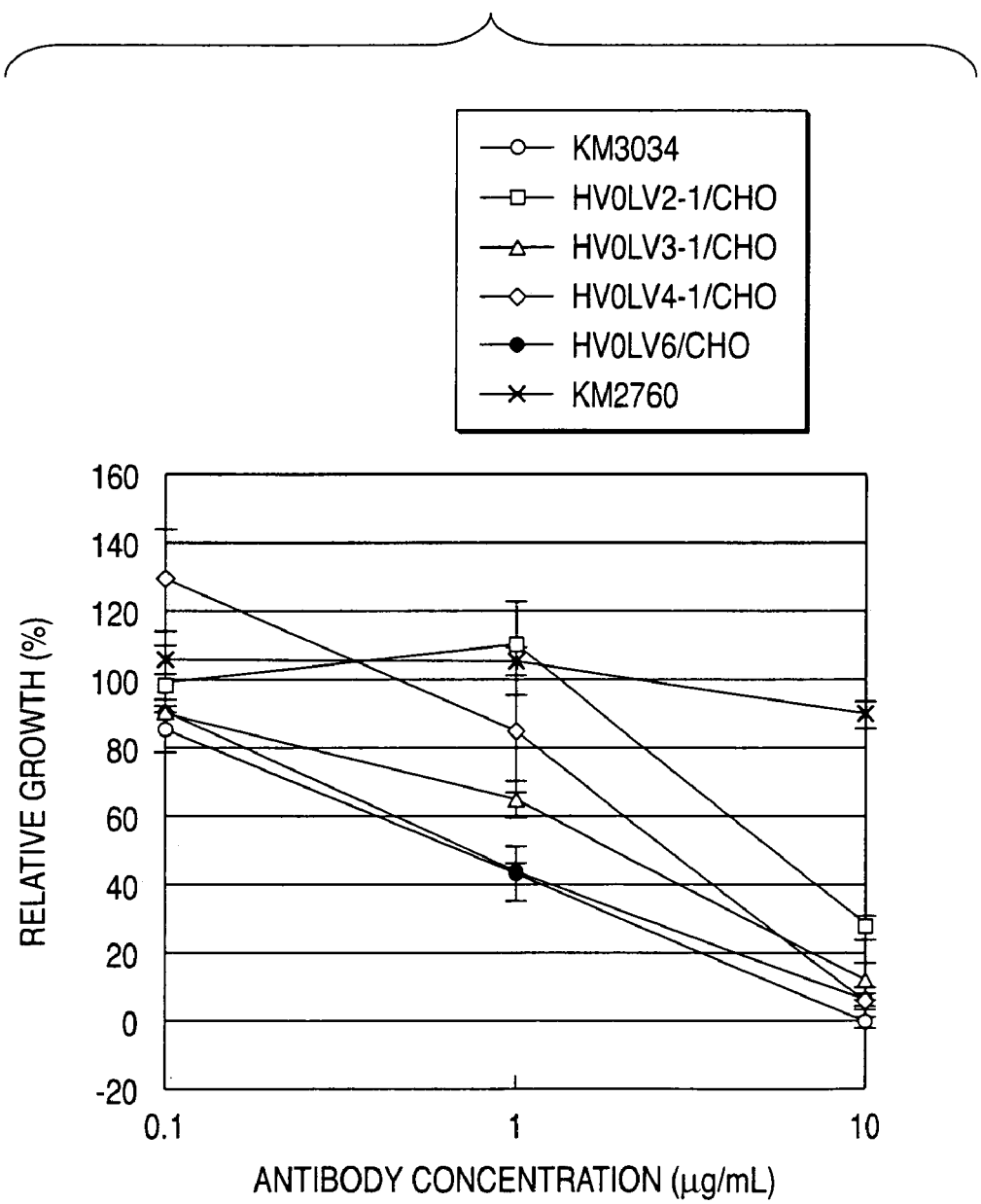
Figure 19:
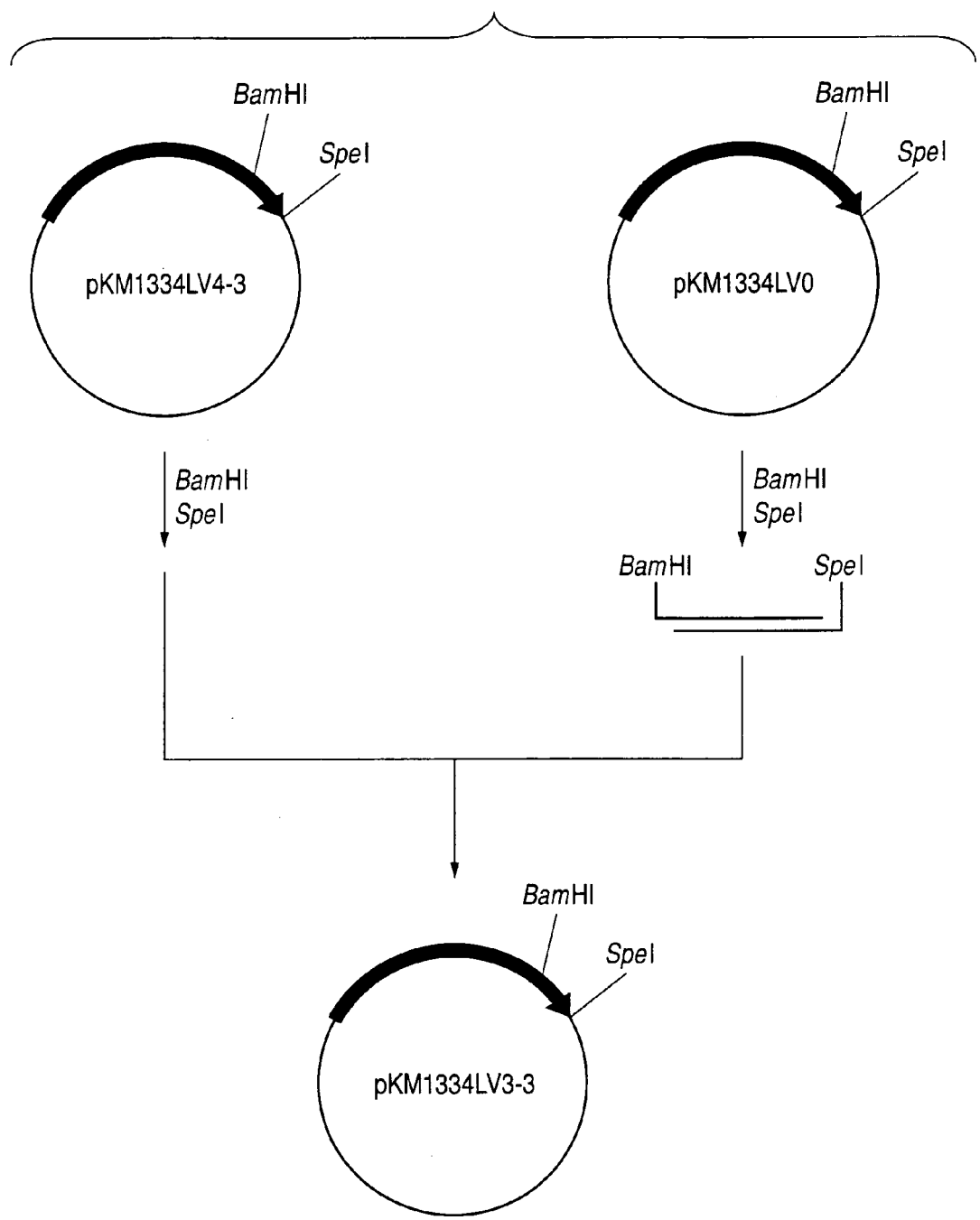
Figure 20:
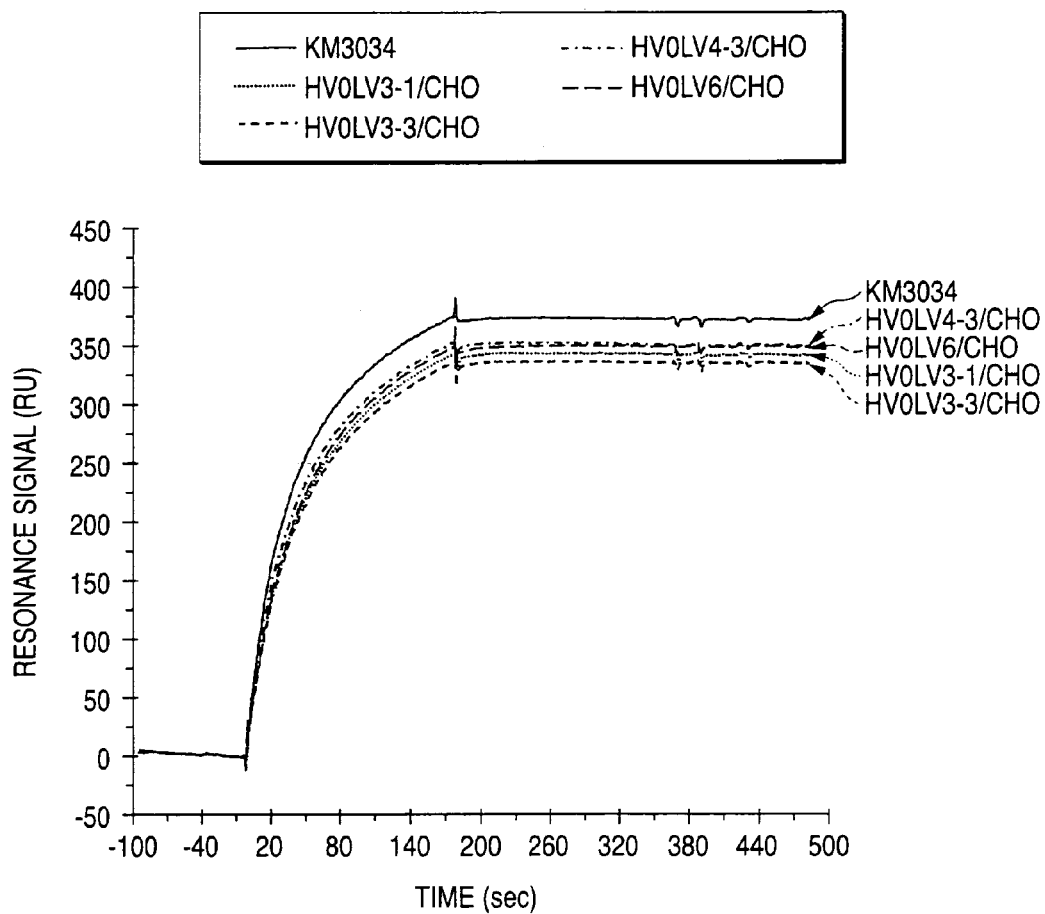
Figure 21:
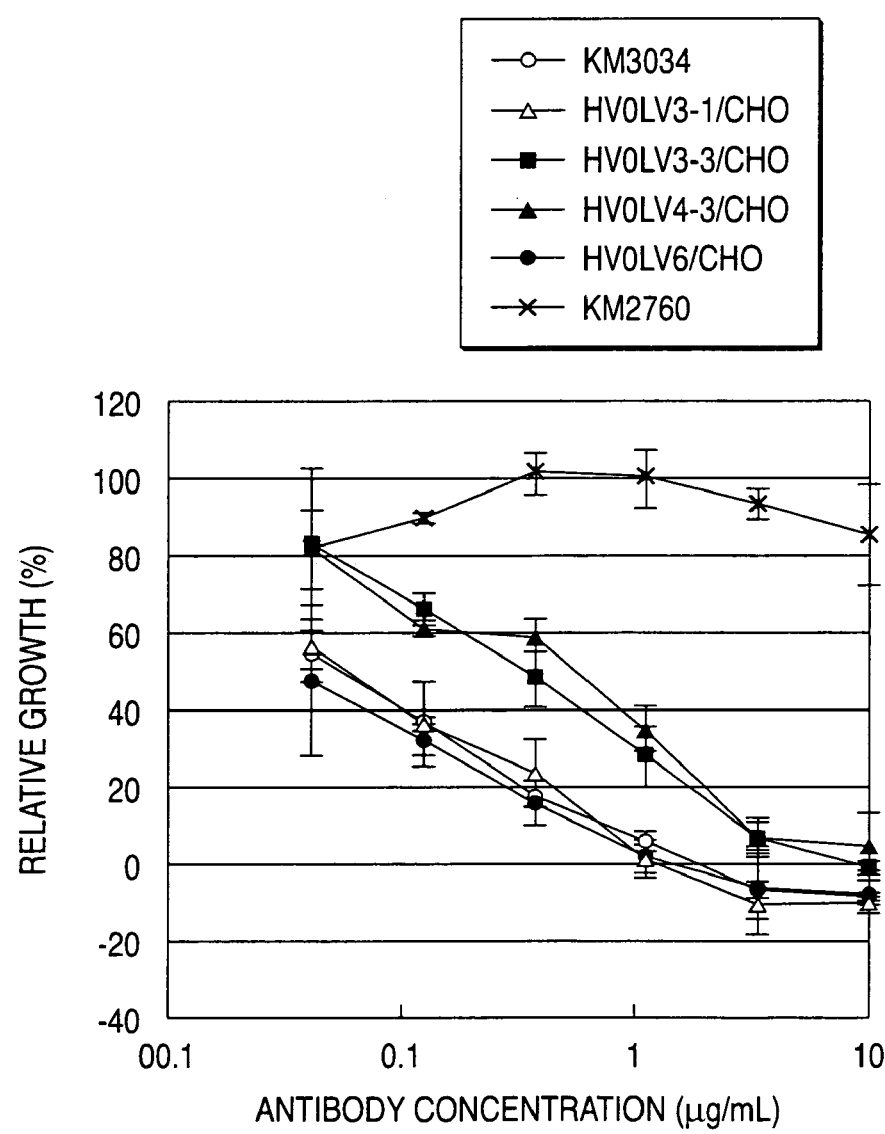
Figure 22:
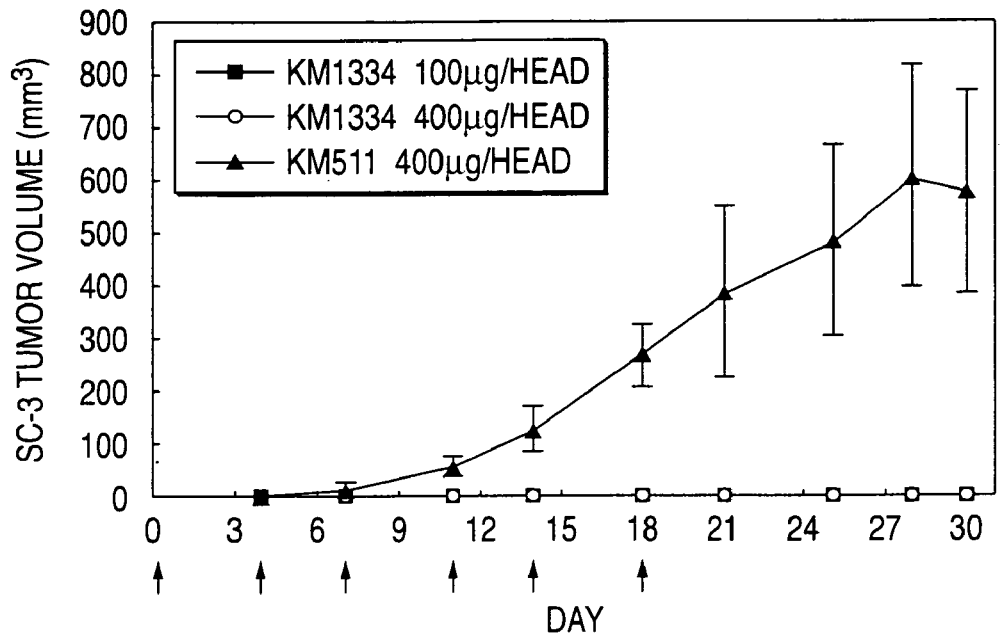
Figure 23:
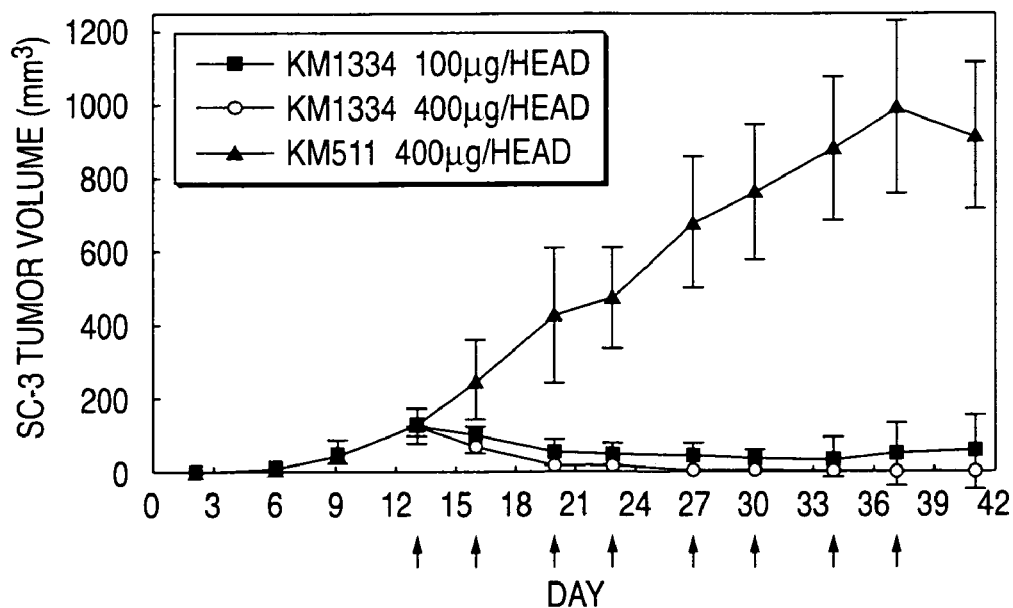
Figure 1:
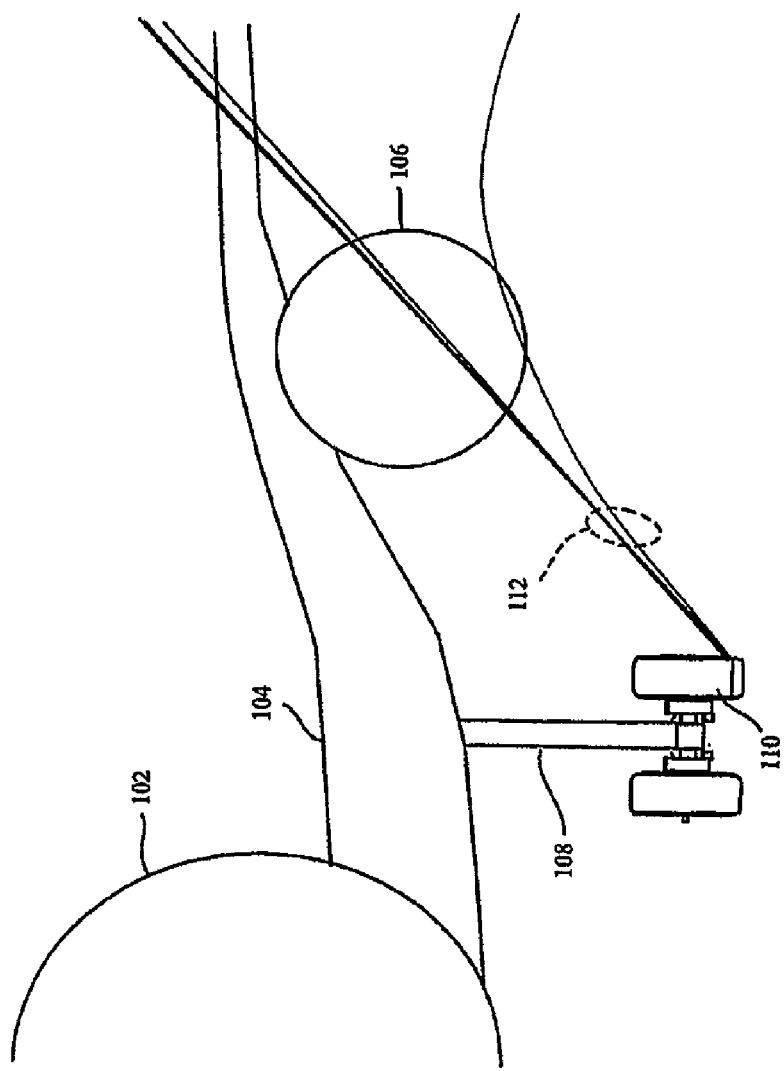
Figure 2:
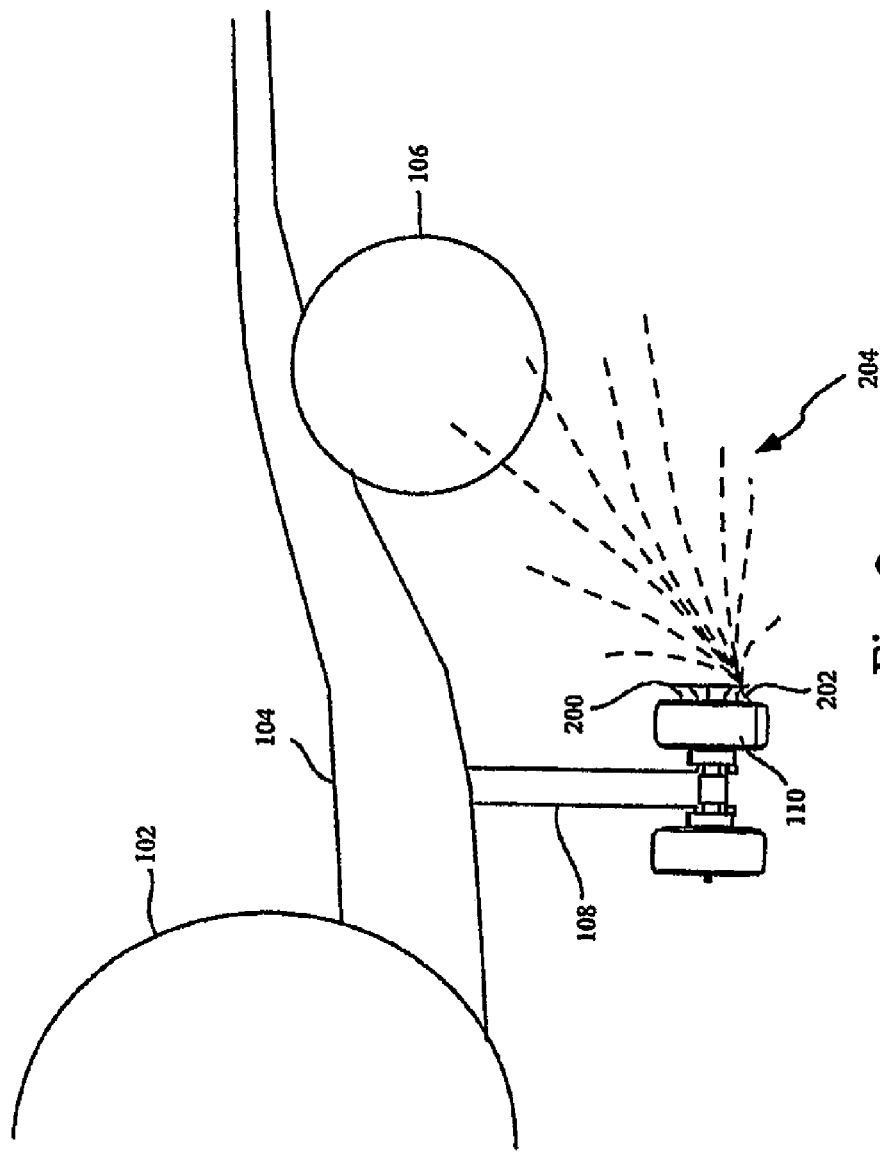

Referring next to FIG. 8, shown is another embodiment of a water spray deflector in accordance with the present invention. Shown is the tire 110, the rim 304, the tire radius 408, the rim radius 410, the rim center 412, the tread surface 414, the water spray deflector 800, attachment arms 802, an inner deflector radius 804, an outer deflector radius 806, a wheel axis 808, an inner deflector edge 810 and an outer deflector edge 812.

As shown in FIG. 8, the water spray deflector 800 in some embodiments is a flat sheet of metal formed into a conical shaped deflector having an inner edge 810 with the inner deflector radius 804 measured from a point on the inner edge of the water spray deflector to the wheel axis 808 running through the rim center 412. Additionally, the water spray deflector 800 has an outer edge with the outer deflector radius 806 measured from a point on the outer edge of the water spray deflector 812 to the wheel axis 808.

As one of ordinary skill in the art recognizes, the water spray deflector 800 is readily constructed from a metal, e.g., Aluminum, however other metals, including alloys, may be used. The attachment arms 802 in several embodiments are Aluminum, but this is certainly not required, and other metals, including alloys, may be used for the attachment arms 802 as well. The deflector 800 may also be attached directly to the rim 304 with out arms 802

In several embodiments, the inner deflector radius 804 is less than the rim radius 410 and the outer deflector radius 806 is less than the tire operating radius 408. By placing the water spray deflector 800 close to the water spray origin 400, the water spray deflector 800 need not have a large surface area, and thus, the weight and aerodynamic drag of the water spray deflector 800 is reduced. In other embodiments, for example, the inner deflector radius 804 is greater than the rim radius 806, and yet, the water spray deflector 800 is able to disrupt an initial display trajectory and mitigate its ability to cause potentially hazardous effects.

Positioning of the water spray deflector 800 is accomplished in a similar fashion as the water spray deflector 300 described with reference to FIG. 5. Specifically, the water spray deflector 800 is positioned to intersect with the path of the initial water spray 202, and depending upon a type of aircraft tire, a distance away from a side wall of the tire to avoid coming in contact with the tire side wall.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for deflecting water away from an aircraft comprising:

a water spray deflector having an inner radius and an outer radius; and a plurality of attachment arms coupled to the water spray deflector wherein the attachment arms are adapted to couple with a rim a distance away from a center of the rim, wherein the rim supports a tire of an aircraft, wherein the rim has a rim radius and the tire has a tire radius;

wherein the outer radius of the spray deflector is less than the radius of the tire;

wherein the attachment arms are configured to support the water spray deflector and the attachment arms position the water spray deflector a distance from a side wall of the tire, wherein the distance is a function of operating conditions of the tire;

wherein the water spray deflector is weakened in areas between coupling points relative to areas of the water spray deflector proximate to the coupling points;

wherein the coupling points are locations where the plurality attachment arms couple to the water spray deflector.

2. The apparatus of claim 1, wherein the inner radius of the water spray deflector is greater than the rim radius.

3. The apparatus of claim 1, wherein the inner radius of the water spray deflector is less than the rim radius.

4. The apparatus of claim 1, wherein the attachment amrs are adapted to couple with a balance lug of the rim.

5. The apparatus of claim 1, wherein the water spray deflector is tubular.

6. The apparatus of claim 1, wherein the water spray deflector is conical.

7. The apparatus of claim 1 wherein the areas between coupling points are weakened by the areas between the coupling points being crimped to have a smaller dimension than areas not crimped.

8. The apparatus of claim 1 wherein the areas between coupling points are weakened by at least one hole in each of the respective areas between the coupling points.

9. The apparatus of claim 1, wherein the distance is a function of lateral and vertical loading conditions of the tire.

10. An apparatus for deflecting water away from an aircraft comprising:

means for deflecting water, wherein the means for deflecting water comprises means for encouraging a failure mode during a tire event;

means for coupling the means for deflecting water to a din of an aircraft wheel, wherein the rim supports a tire; and means for positioning the means for deflecting water a distance from a side wall of the tire to prevent the side wall of the tire from contacting the mean for deflecting water.

11. The apparatus of claim 10, wherein the means for deflecting water comprises a tubular deflector.

12. The apparatus of claim 11, wherein the tubular deflector comprises a circular cross section.

13. The apparatus of claim 10, wherein the means for deflecting comprises a sheet configured in a conical shape.

14. The apparatus of claim 10, wherein the means for coupling the means for deflecting water comprises a connector adapted to couple with a balance lug of the rim.

15. A method for making a water spray deflector comprising:

forming a water spray deflector having an inner radius and an outer radius wherein the outer radius is a function of a radius of an aircraft tire;

preparing a plurality of attachment arms wherein the attachment arms are sized and configured as a function of operating characteristics of the aircraft tire; and coupling the plurality of attachment arms to the water spray wherein the attachment arms are adapted to couple with a rim, wherein the rim supports the aircraft tire;

weakening portions of the water spray deflector between coupling points relative to areas of the water spray deflector proximate to the coupling points.

16. The method of claim 15 further comprising coupling the attachment arms to a balance lug of the rim.

17. The method of claim 16, wherein the step of weakening portions of the water spray deflector comprises crimping the portions of the water spray deflector to have a smaller dimension than areas not crimped.

18. The method of claim 16, wherein the step of weakening portions of the water spray deflector comprises drilling at least one hole in each of the portions of the water spray deflector.

* * * * *

UNITED STATES PATENT AND TRADEMARK OFFICE
CERTIFICATE OF CORRECTION

PATENT NO. : 7,118,067 B2
APPLICATION NO. : 10/434747
DATED : October 10, 2006
INVENTOR(S) : Cottet et al.

It is certified that error appears in the above-identified patent and that said Letters Patent is hereby corrected as shown below:

The title page showing the illustrative figure should be deleted and substitute with the attached title page.

The drawing sheet, consisting of Fig. 1-8, should be deleted and replaced with drawing sheet, consisting of Fig. 1-8, as shown on the attached page.

Signed and Sealed this

Twenty-second Day of May, 2007

JON W. DUDAS
*Director of the United States Patent and Trademark Office*

(12) United States Patent
Cottet et al.

(10) Patent No.: US 7,118,067 B2
(45) Date of Patent: Oct. 10, 2006

(54) WHEEL MOUNTED WATER SPRAY DEFLECTOR

(75) Inventors: Justin D. Cottet, Snohomish, WA (US); Mark N. Simpson, Kirkland, WA (US)

(73) Assignee: The Boeing Company, Chicago, IL (US)

(*) Notice: Subject to any disclaimer, the term of this patent is extended or adjusted under 35 U.S.C. 154(b) by 390 days.

(21) Appl. No.: 10/434,747

(22) Filed: May 9, 2003

(65) Prior Publication Data
US 2004/0222330 A1 Nov. 11, 2004

(51) Int. Cl.
*B64C 25/00* (2006.01)
(52) U.S. Cl. .................. 244/103 R; 244/103 S
(58) Field of Classification Search ............ 244/103 S, 244/105, 108, 103 R, 100 R; 301/37.101, 301/37.23, 37.24
See application file for complete search history.

(56) References Cited

U.S. PATENT DOCUMENTS

| | | | |
|---|---|---|---|
| 1,200,061 A | 10/1916 | Wentworth | |
| 1,403,445 A | 1/1922 | Rothmann | |
| 1,421,239 A | 6/1922 | Hundleby et al. | |
| 2,370,316 A * | 2/1945 | Jual | 244/103 S |
| 3,313,501 A | 4/1967 | Williams | |
| 4,389,029 A | 6/1983 | Gissenapp et al. | |
| 6,032,900 A * | 3/2000 | Smith | 244/103 S |

* cited by examiner

Primary Examiner—Peter M. Poon
Assistant Examiner—Timothy D. Collins
(74) Attorney, Agent, or Firm—Thomas F. Lebens; Fitch, Even, Tabin & Flannery

(57) ABSTRACT

A water spray deflector to deflect water spray produced from aircraft landing gear from components of the aircraft. The water spray deflector has an inner diameter and an outer diameter. Coupled to the spray deflector are attachment arms that are adapted to couple with an outer portion of a rim of the landing gear. The attachment arms are also configured to support the water spray deflector position the water spray deflector a distance from a side wall of the tire to prevent the side wall of the tire from coming in contact with the water spray deflector under various loading conditions placed on the tire. In some versions, the water spray deflector is weakened in areas to encourage a failure mode of the water spray deflector.

18 Claims, 21 Drawing Sheets

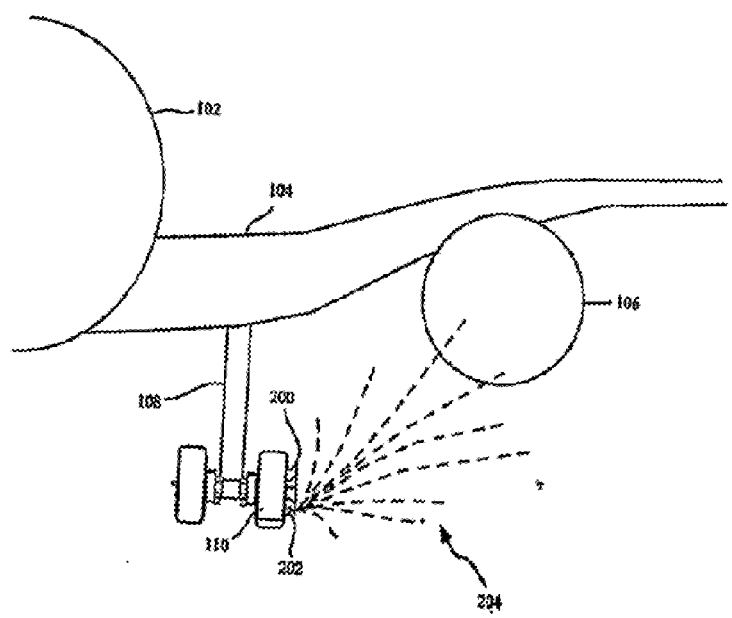

(Water Spray w/o Deflector)

(Water Spray with Deflector)